(12) United States Patent
Adams, Jr. et al.

(10) Patent No.: US 6,792,329 B2
(45) Date of Patent: Sep. 14, 2004

(54) CONSTRUCTION OF COLORED IMAGES ON ABSORBENT SUBSTRATES USING A COMPUTER-AIDED DESIGN SYSTEM

(75) Inventors: Louis W. Adams, Jr., Inman, SC (US); Ronald Magee, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 317 days.

(21) Appl. No.: 09/934,729

(22) Filed: Aug. 22, 2001

(65) Prior Publication Data

US 2003/0058250 A1 Mar. 27, 2003

(51) Int. Cl.$^7$ ............................ D06B 1/02; D06B 11/00; G06F 19/00
(52) U.S. Cl. ......................... 700/133; 345/604; 347/15
(58) Field of Search ................................ 700/133, 130, 700/131, 132; 347/43, 15; 358/1, 9, 518; 101/171, 211; 345/589, 591, 596, 597, 598, 603, 604

(56) References Cited

U.S. PATENT DOCUMENTS

| | | | | |
|---|---|---|---|---|
| 4,635,078 A | * | 1/1987 | Sakurada et al. | 347/15 |
| 5,428,720 A | * | 6/1995 | Adams, Jr. | 345/604 |
| 5,805,178 A | * | 9/1998 | Silverbrook | 347/15 |
| 6,062,137 A | | 5/2000 | Guo et al. | 101/171 |
| 6,704,610 B2 | * | 3/2004 | West et al. | 700/133 |

OTHER PUBLICATIONS

"A Model for Colour Prediction of Halftoned Samples Incorporating Light Scattering and Ink Spreading", *Proceedings of the IS&T/SID 7$^{th}$ Imaging Conference: Color Science, Systems and Applications*, Nov. 16–19, 1999, p. No. 173–181.

"A Unified Model for Color Prediction of Halftoned Prints", *Journal of Imaging Science and Technology®*, vol. 44 No. 4, Jul./Aug. 2000, p. No. 351–359, 385.

"Color Invariance", *IEEE Transactions on Pattern Analysis and Machine Intelligence*, vol. 23 No. 12, Dec. 2001, p. No. 1338–1346.

* cited by examiner

Primary Examiner—Peter Nerbun
(74) Attorney, Agent, or Firm—Terry T. Moyer; George M. Fisher

(57) ABSTRACT

A computer-assisted process for the design and placement of multi-colored patterns on absorbent substrates using a limited number of transparent process colorants is described. Through use of this system, a designer, working with a computer-aided design system, can generate and accurately represent on a computer monitor or similar display a multi-colored pattern, as that pattern would appear on a specified absorbent substrate, using coloring elements comprised of groups of multiple pixels in which process colors have been mixed in a controlled manner to expand the range of available colors, and to compensate for colorant delivery limitations that prevent the application of small, accurately metered quantities of colorant. Actuation instructions for a specific dye injection machine capable of patterning a moving textile substrate may be generated.

45 Claims, 26 Drawing Sheets

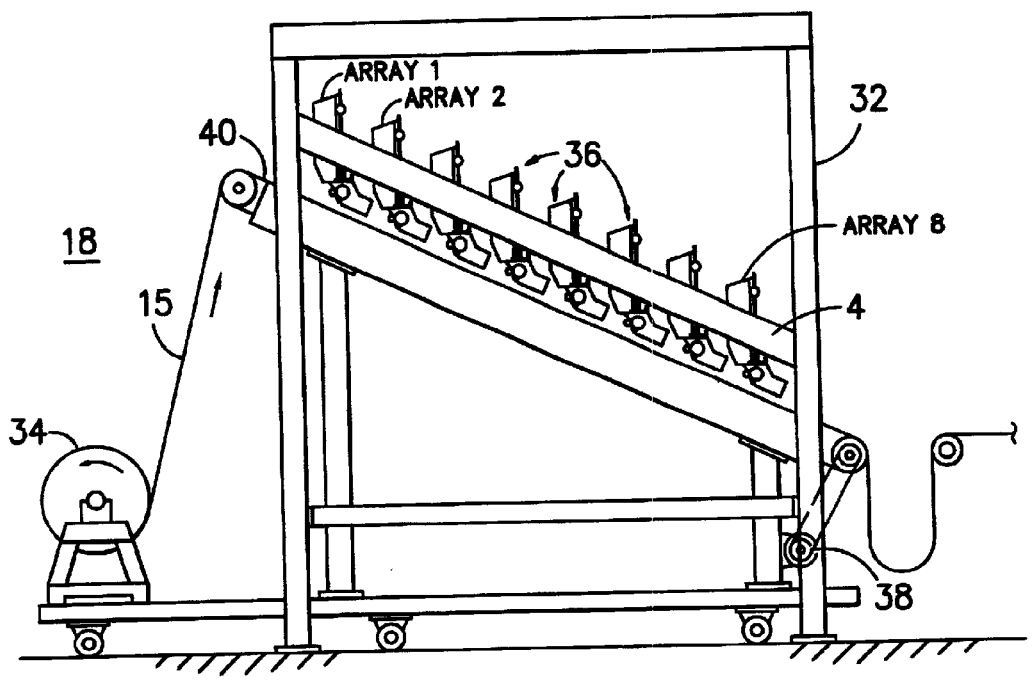
FIG. —1—

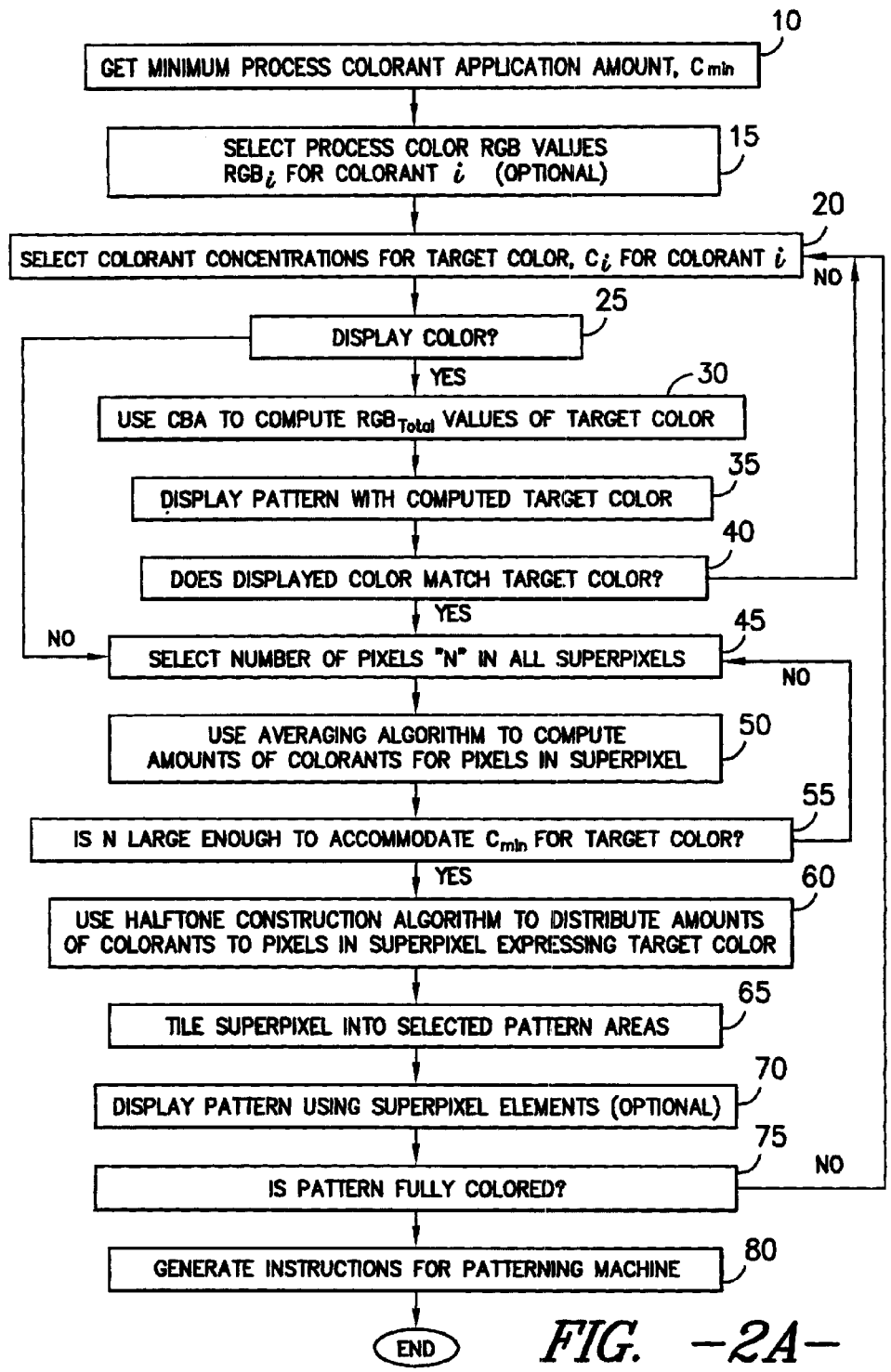
FIG. -2A-

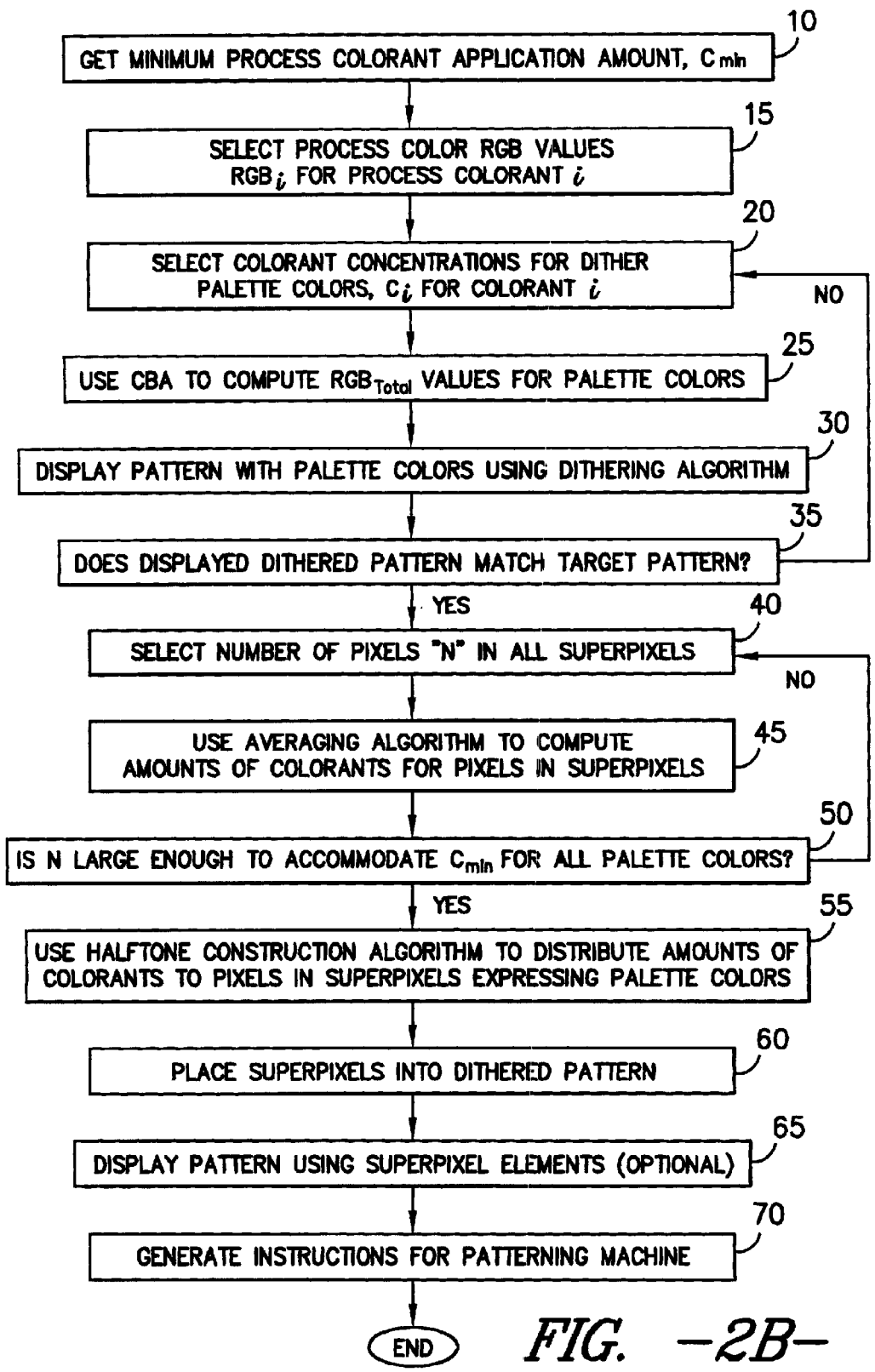
FIG. -2B-

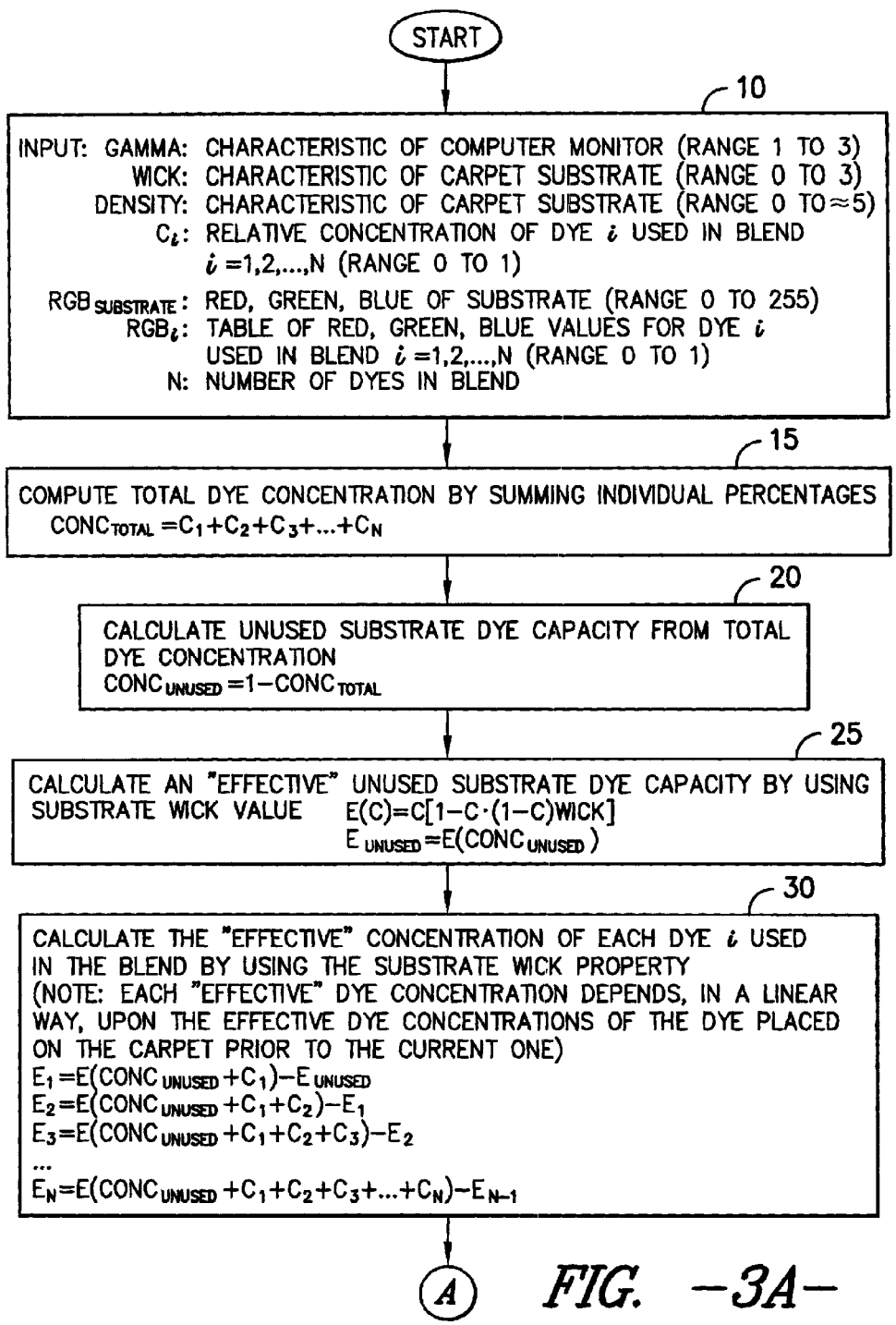
FIG. −3A−

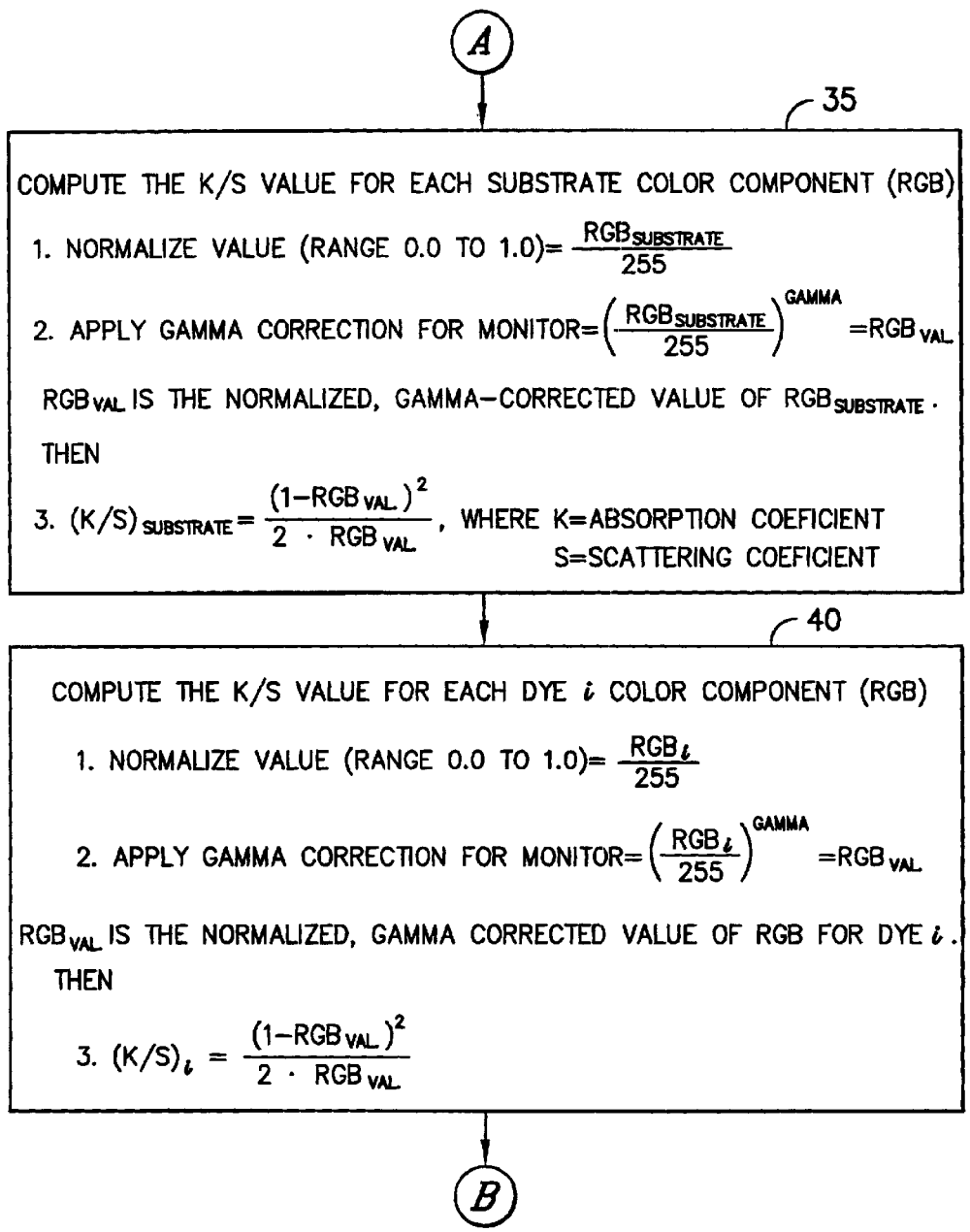
FIG. -3B-

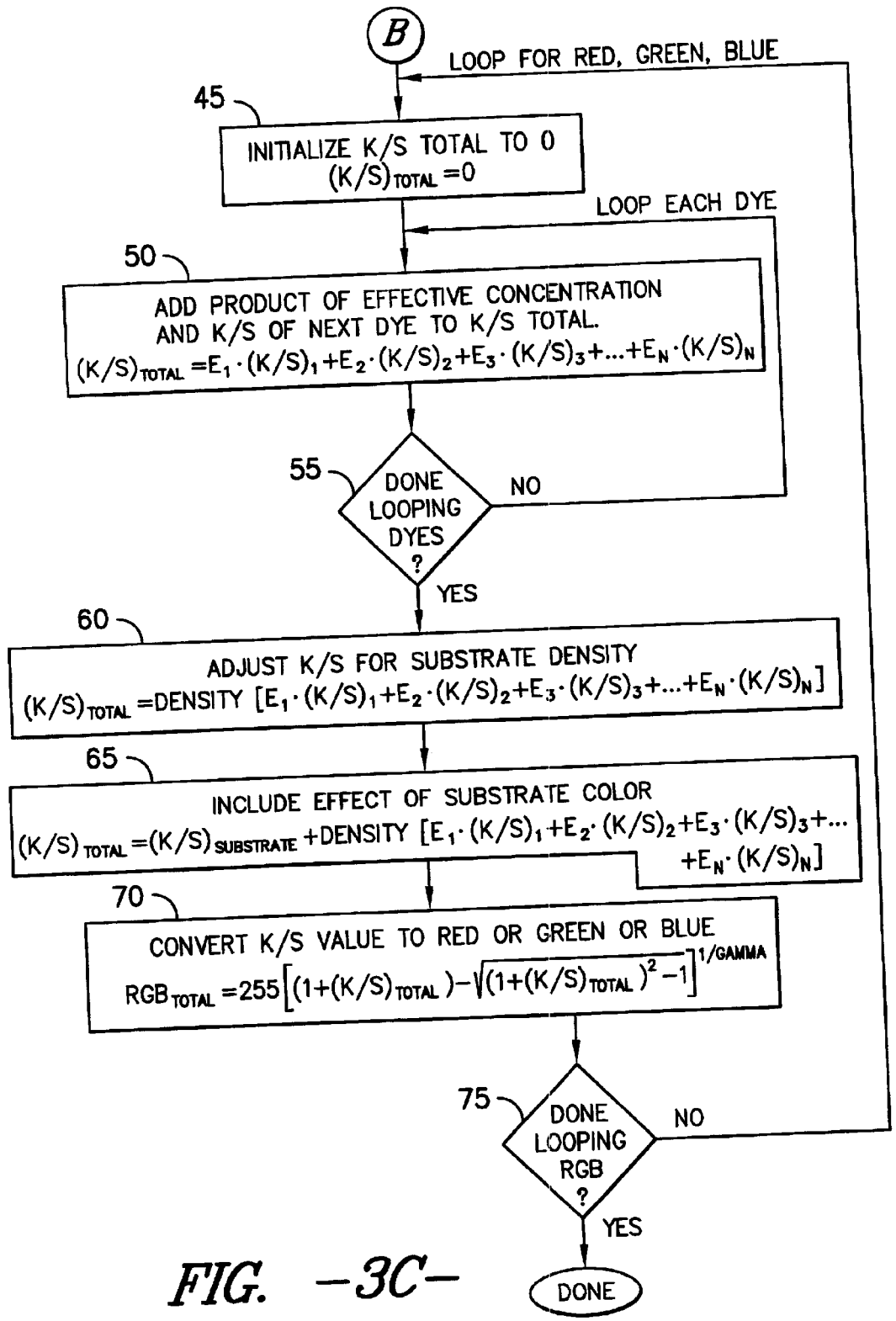
FIG. -3C-

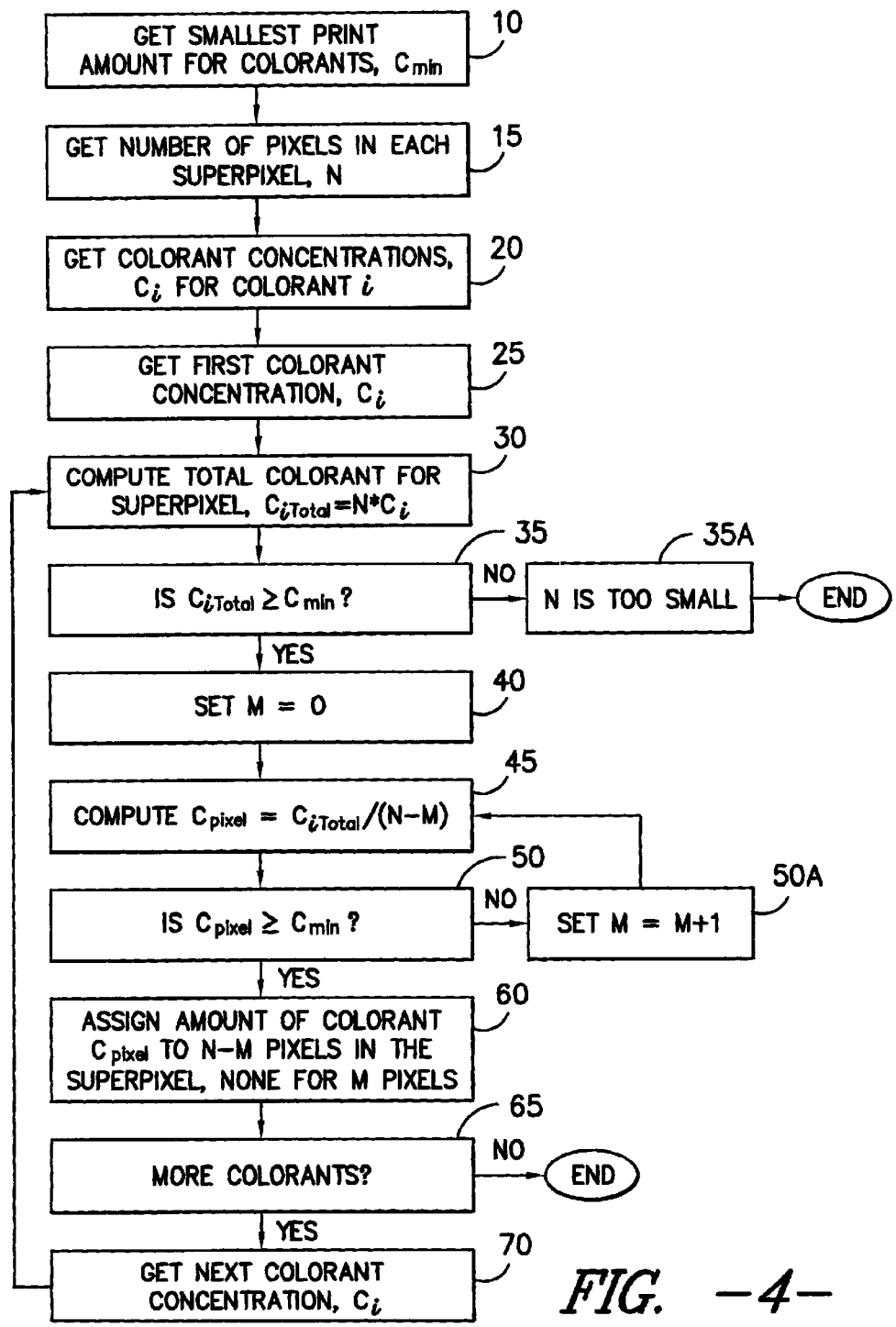
FIG. —4—

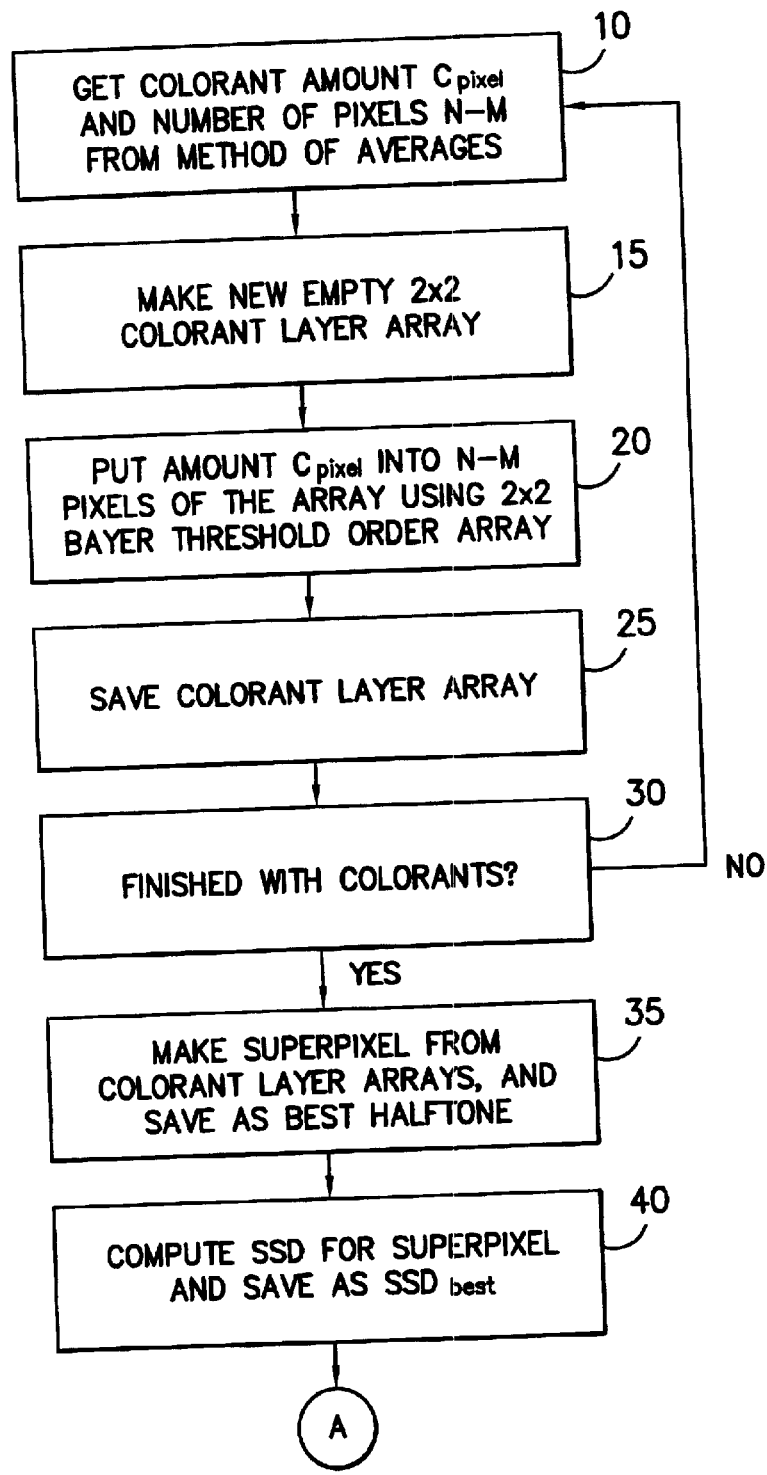
FIG. -5A-

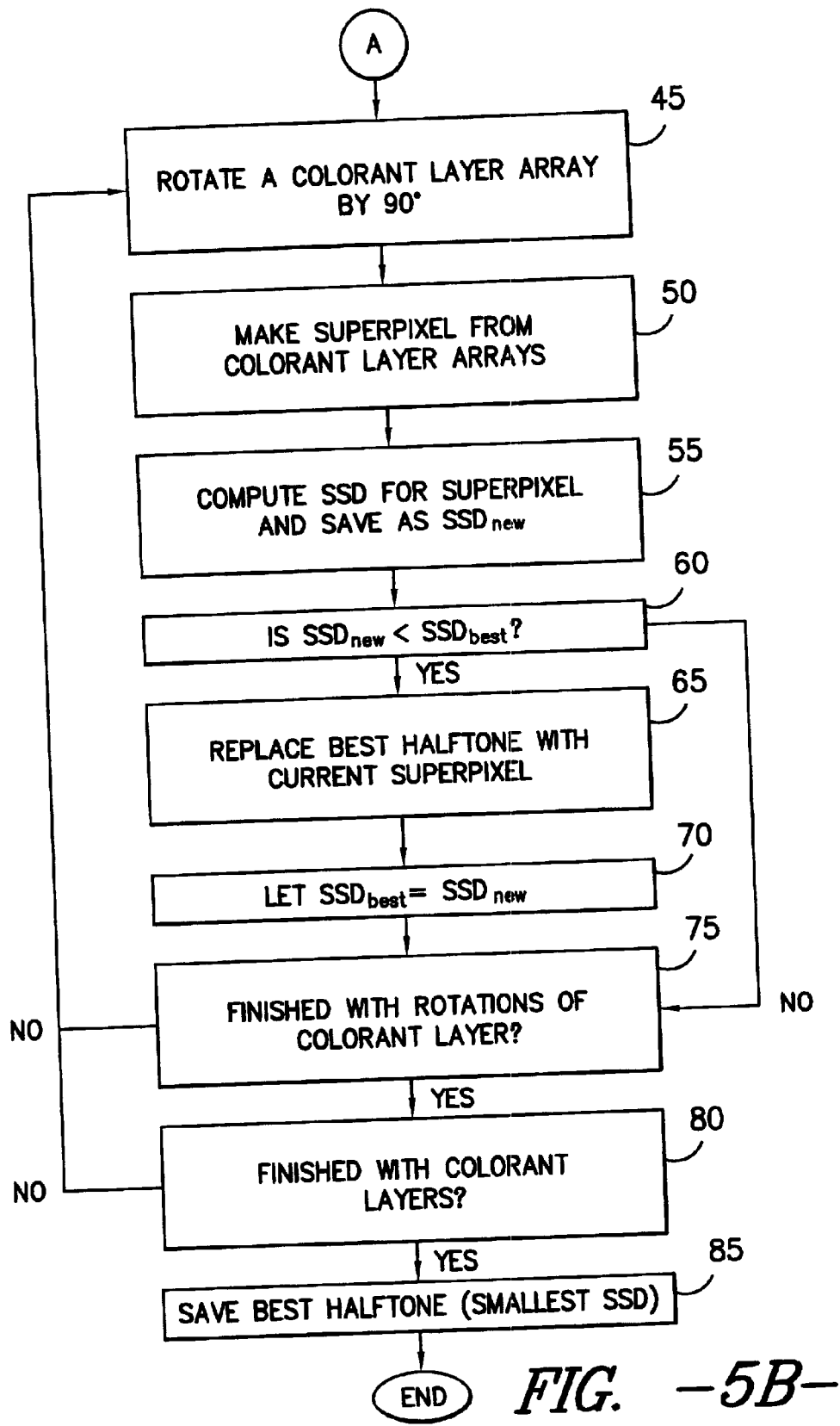
FIG. —5B—

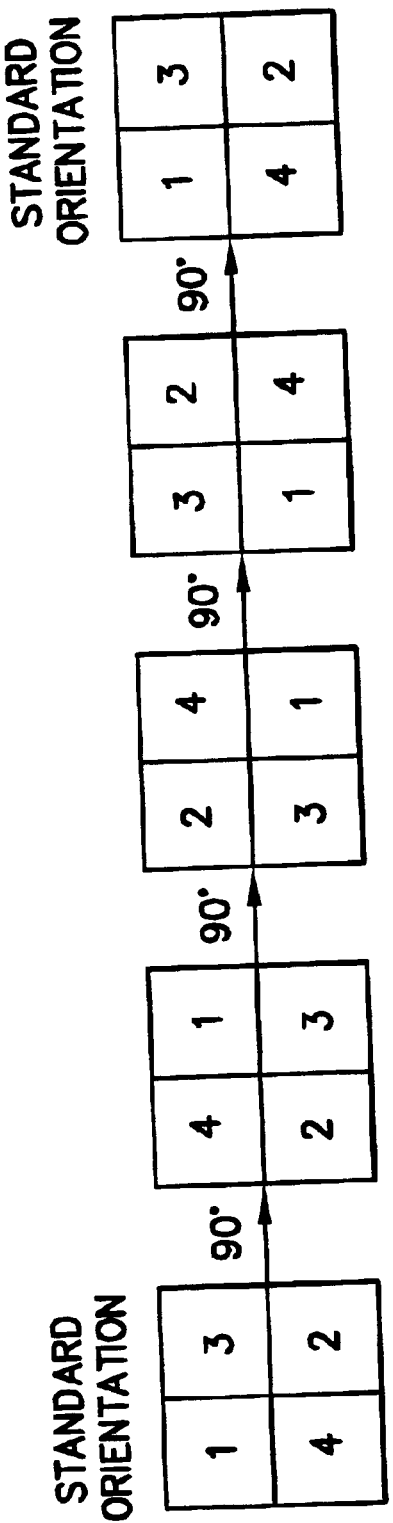
FIG. -6-

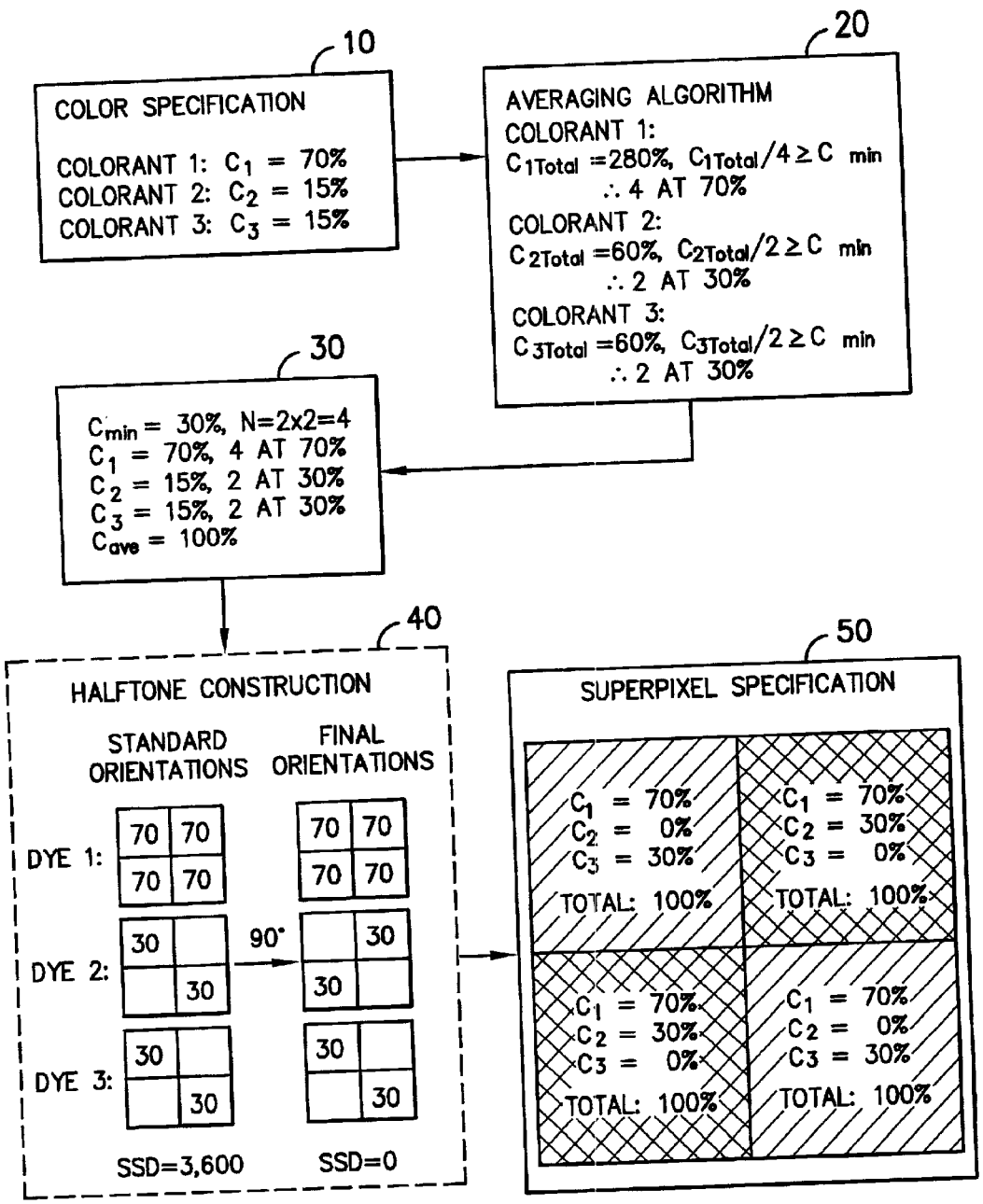
FIG. -7-

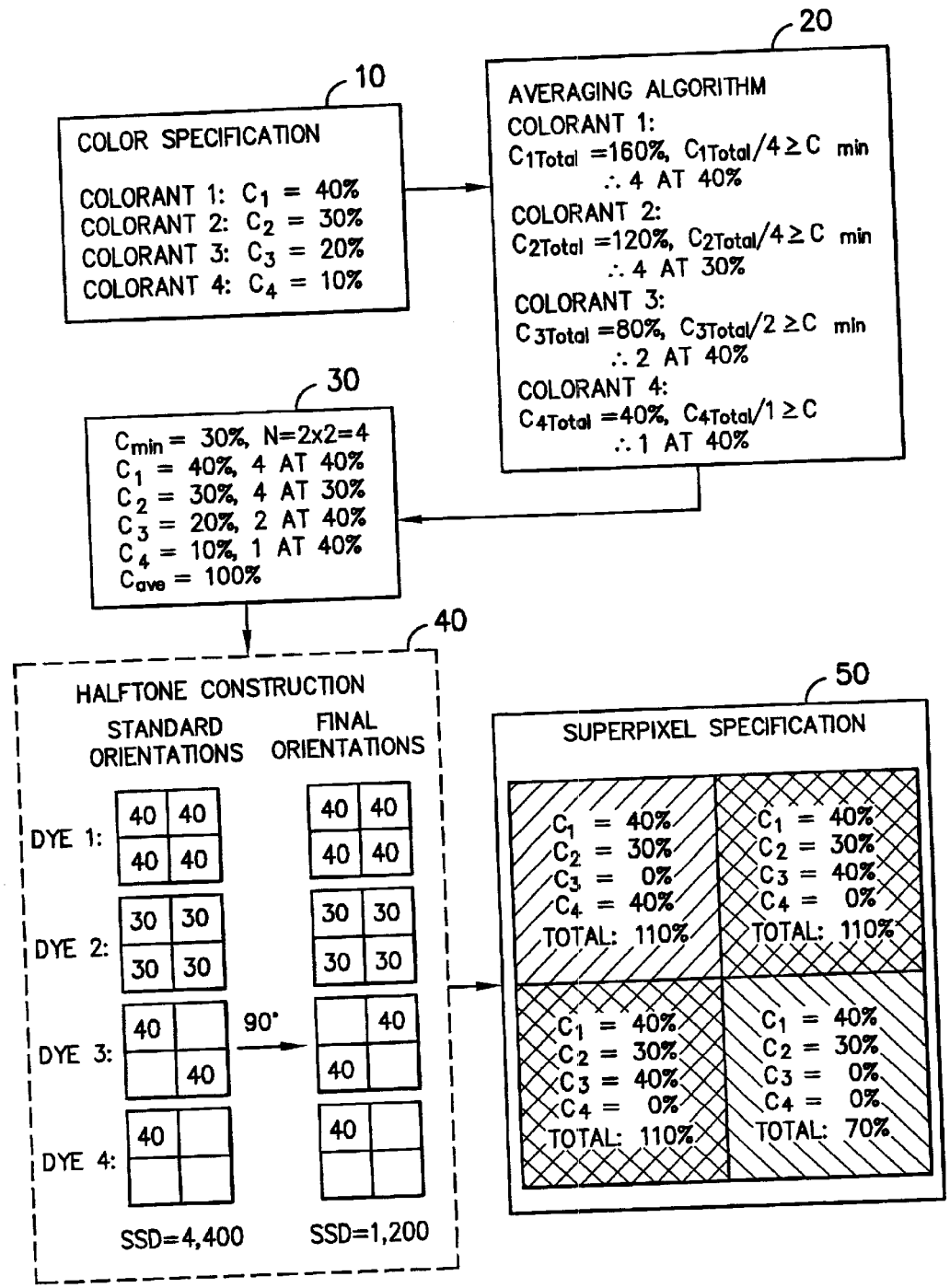
FIG. —8—

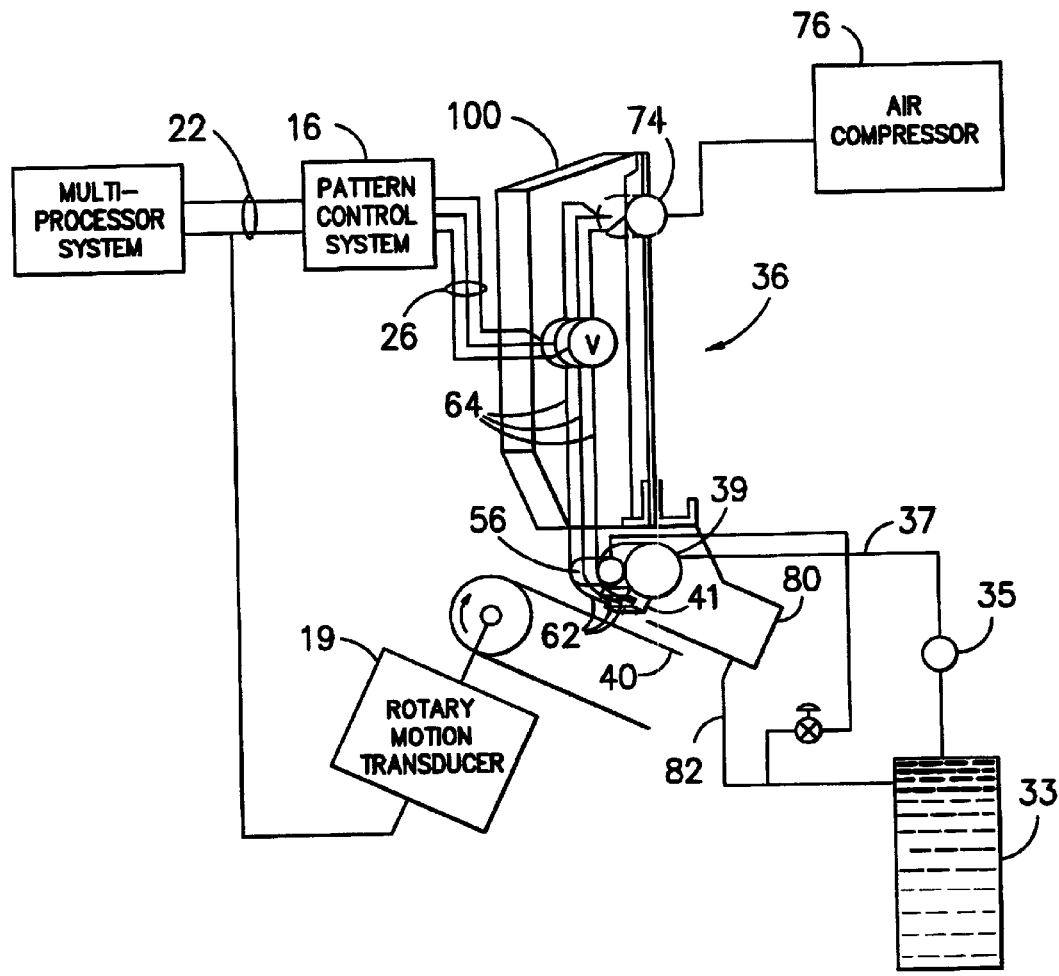
FIG. -9-

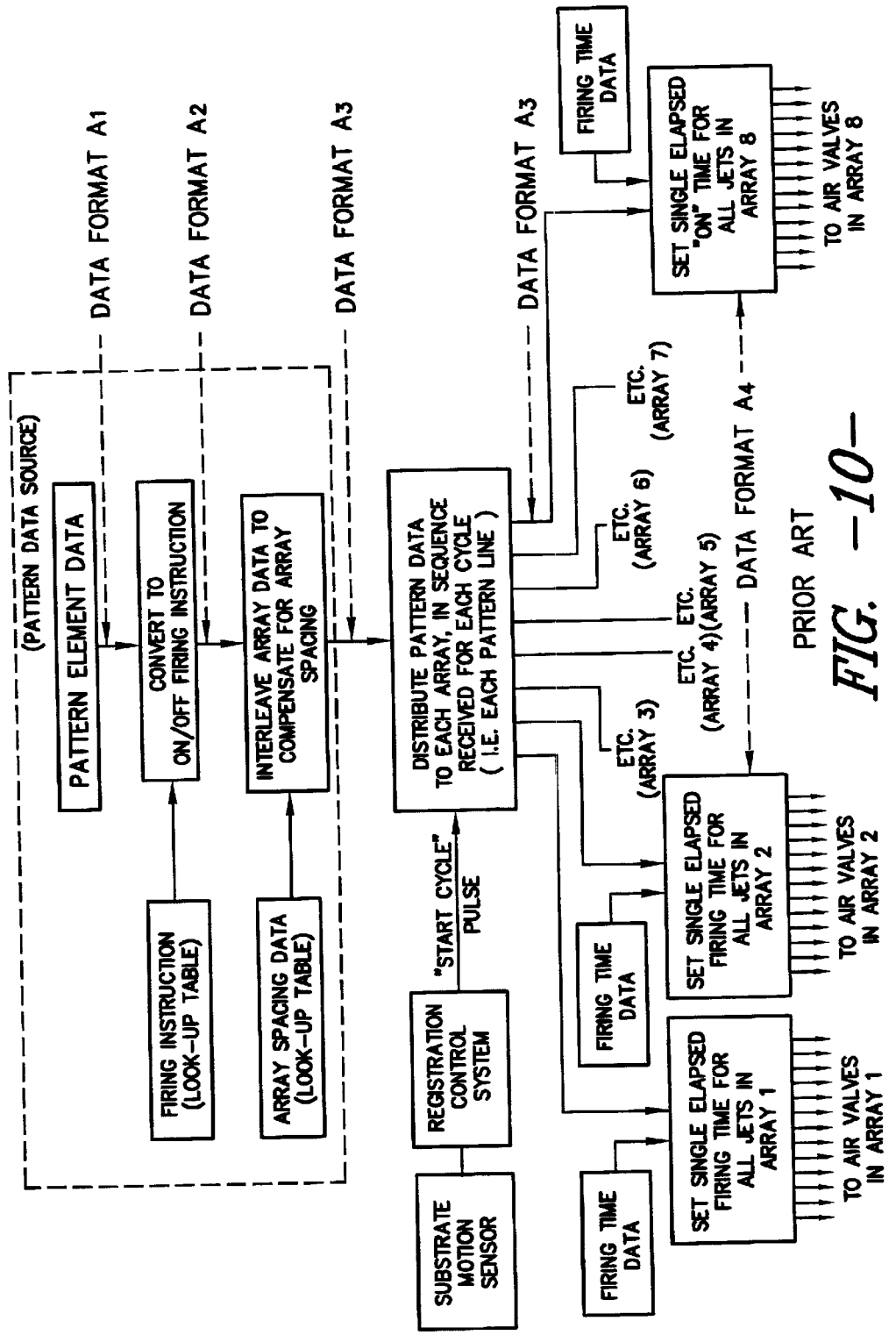
FIG. -10- PRIOR ART

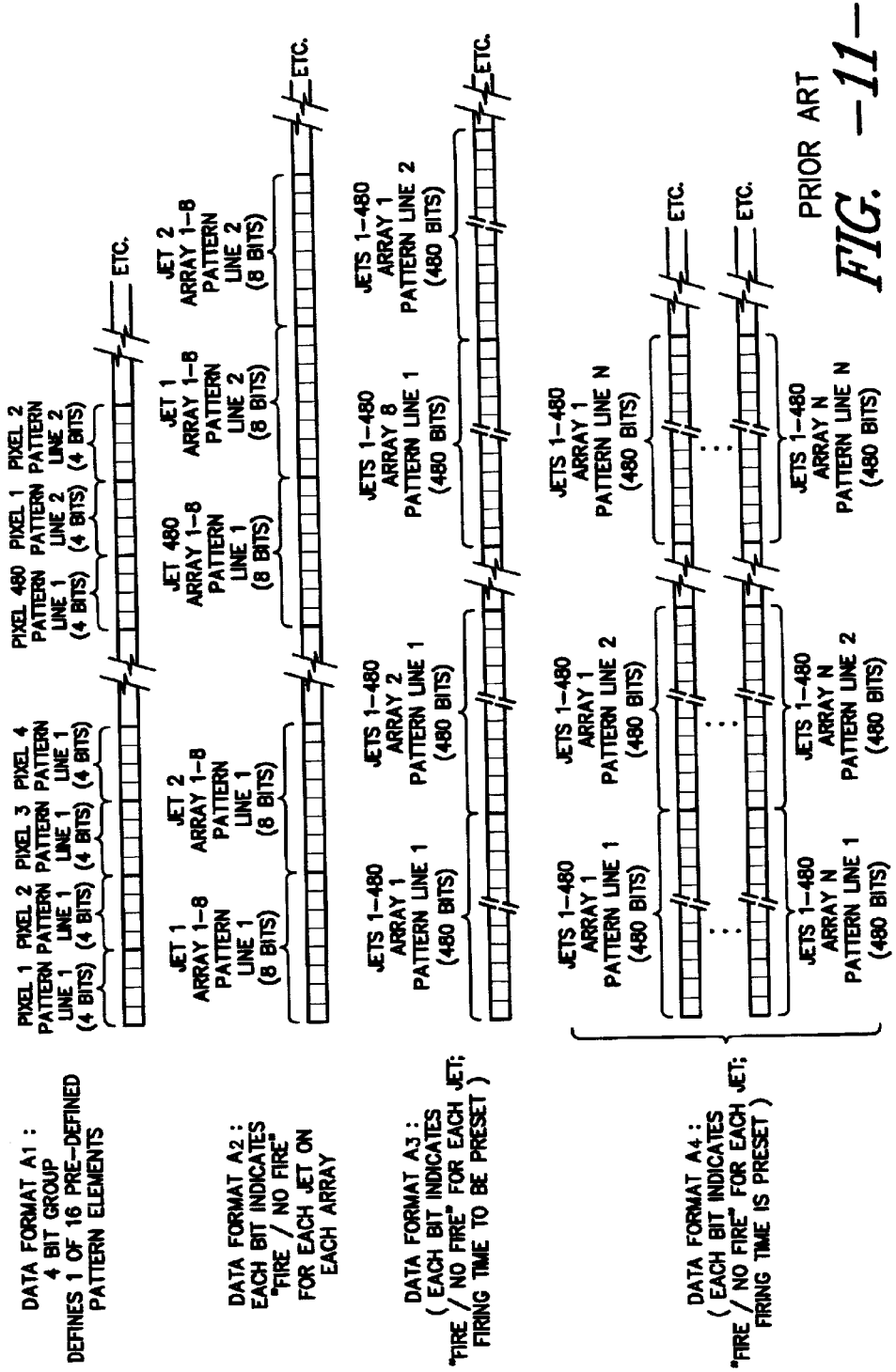
FIG. -11- PRIOR ART

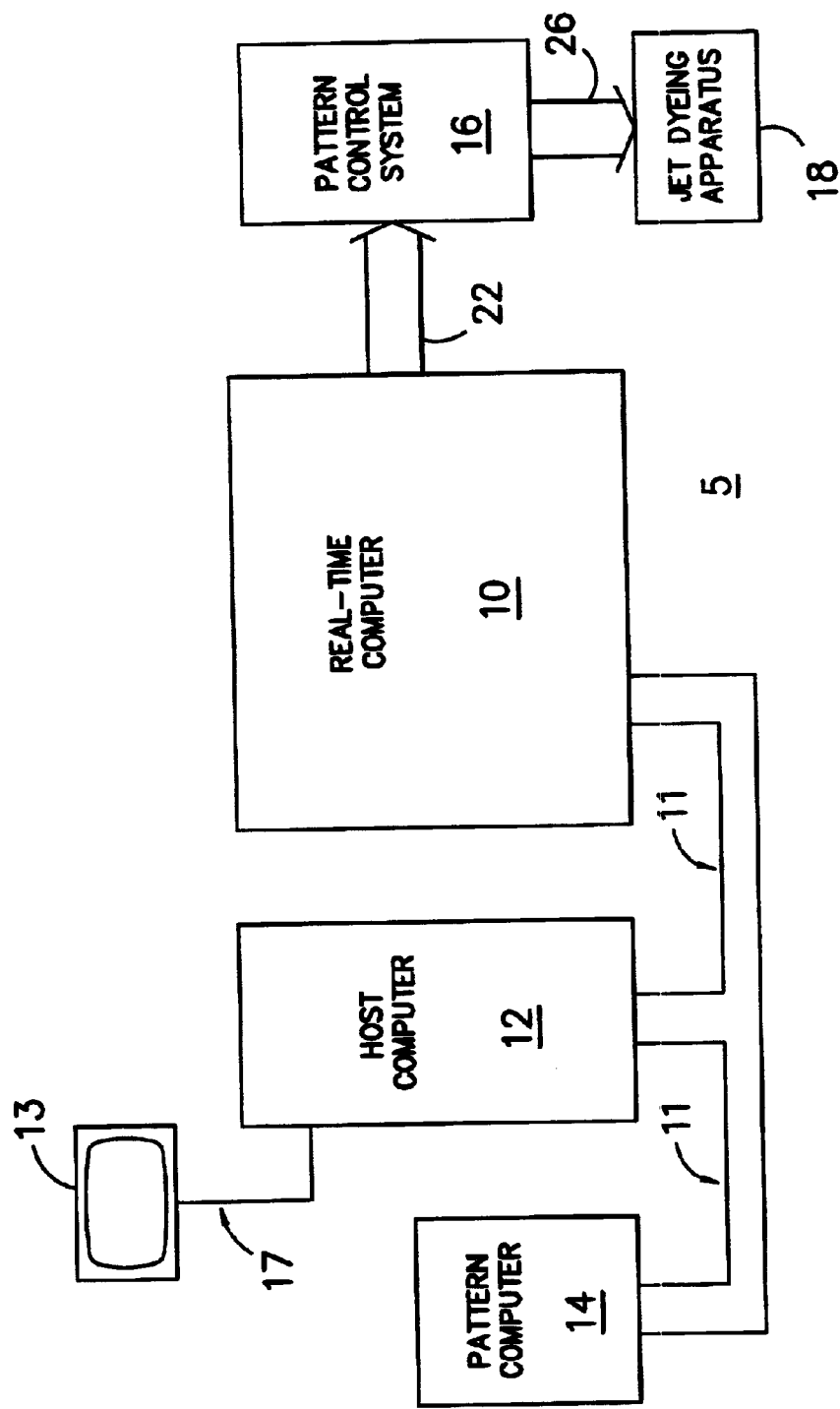
FIG. -12-

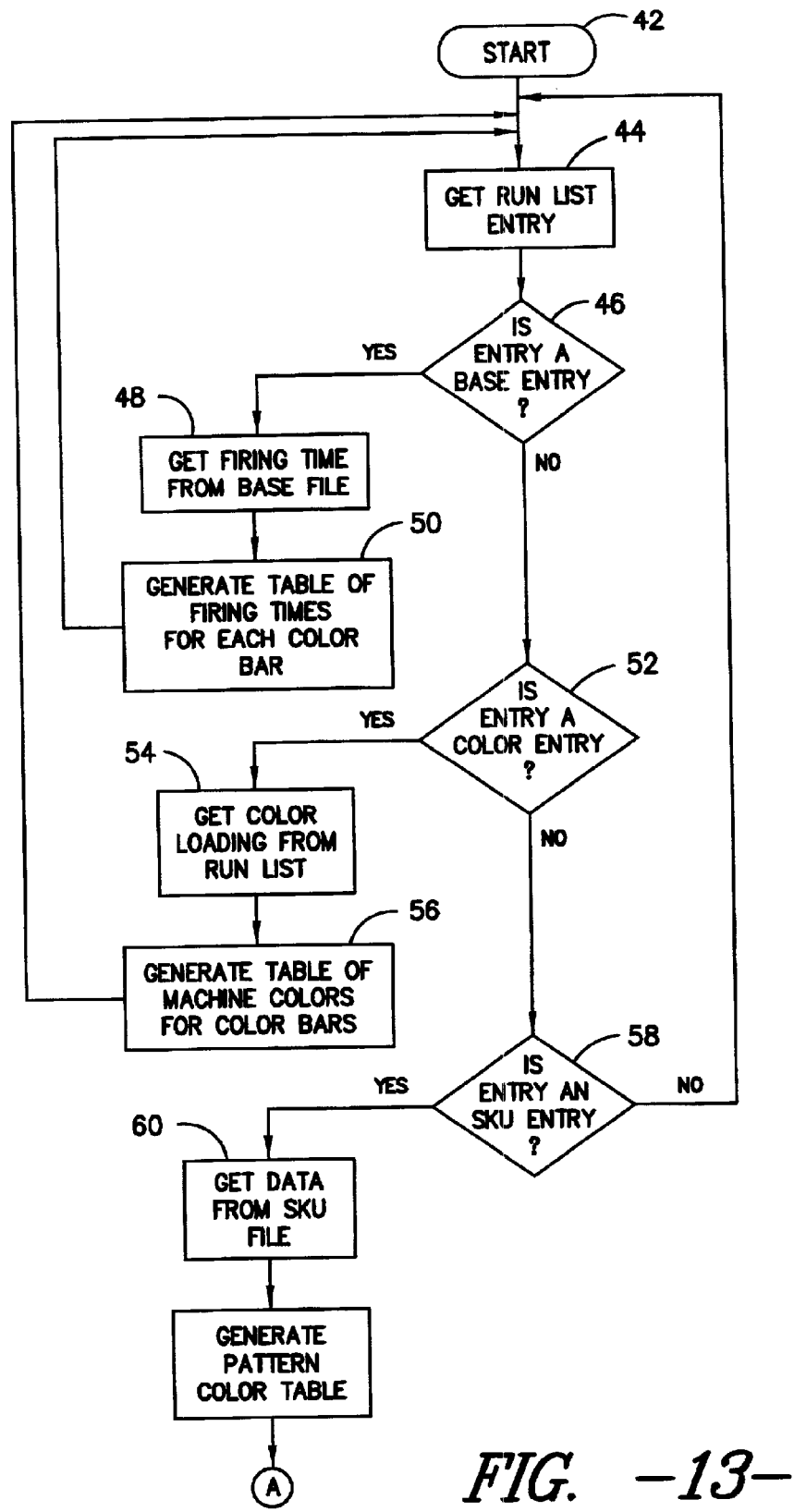
FIG. −13−

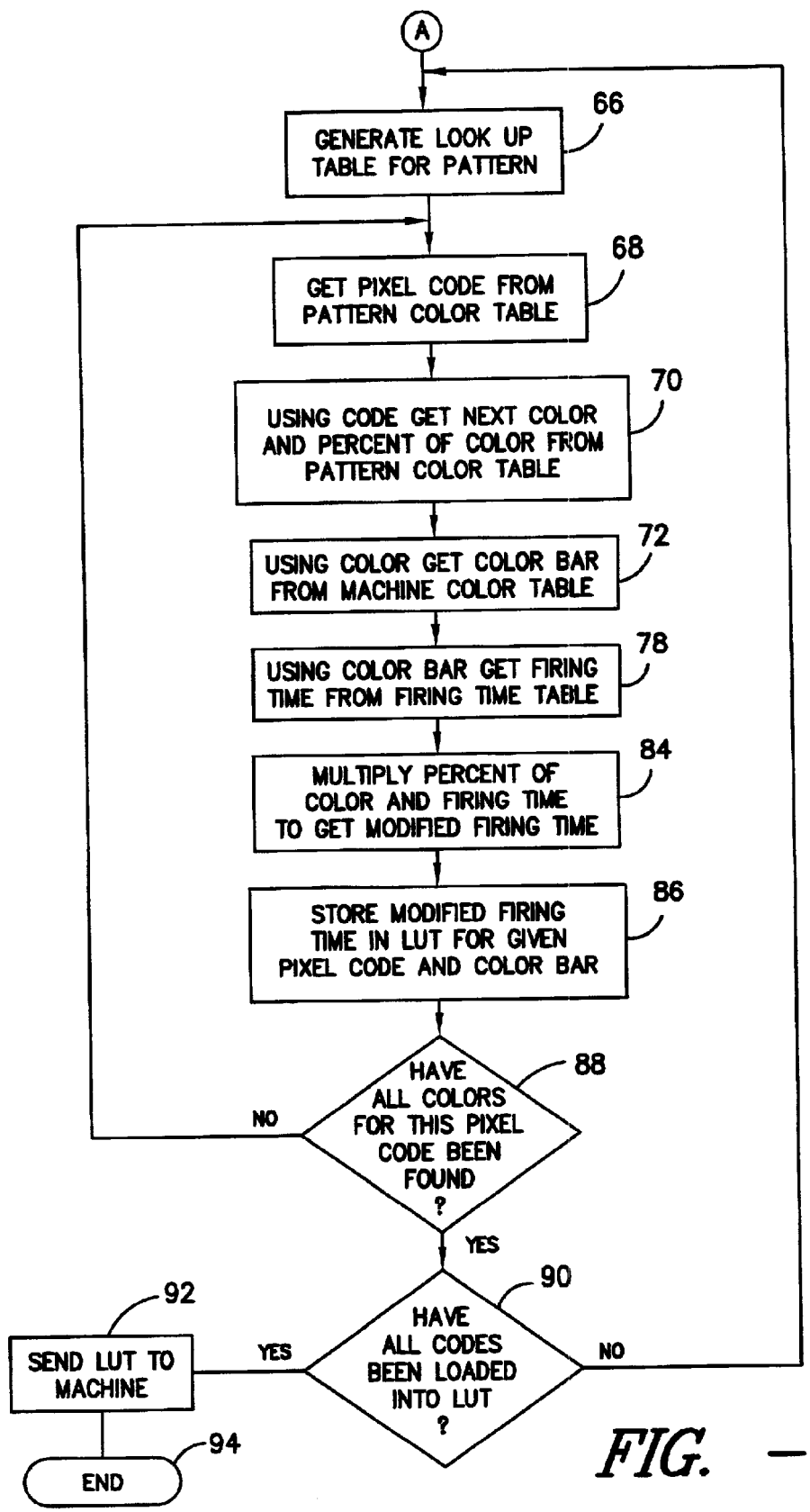
FIG. -14-

FIG. —15A—

BASE WXYZ

| BAR | FT |
|---|---|
| 1 | 10 |
| 2 | 10 |
| 3 | 20 |
| 4 | 15 |

FIG. —15B—

MACHINE CONFIG.

| COLOR | BAR |
|---|---|
| RED | 1 |
| BLUE | 2 |
| GREEN | 3 |
| YELLOW | 4 |

FIG. —15C—

SKU ABC

| CODE | COLOR |
|---|---|
| A | RED |
| B | BLUE |

FIG. —16A—

BASE WXYZ

| BAR | FT |
|---|---|
| 1 | 10 |
| 2 | 10 |
| 3 | 20 |
| 4 | 15 |

FIG. —16B—

MACHINE CONFIG.

| COLOR | BAR |
|---|---|
| RED | 1 |
| BLUE | 2 |
| GREEN | 3 |
| YELLOW | 4 |

FIG. —16C—

SKU ADE

| CODE | COLOR |
|---|---|
| A | 50% RED, 50% BLUE |
| C | GREEN |

FIG. -15D-

LUT'S

| CODES | 1 | 2 | 3 | 4 |
|---|---|---|---|---|
| A | 10MS | 0 | 0 | 0 |
| B | 0 | 10MS | 0 | 0 |
| | | | | |

FIG. -16D-

LUT'S

| | 1 | 2 | 3 | 4 |
|---|---|---|---|---|
| A | 5MS | 5MS | 0 | 0 |
| C | 0 | 0 | 20MS | 0 |
| | | | | |

FIG. -16E-

LUT'S

| | 1 | 2 | 3 | 4 |
|---|---|---|---|---|
| A | 0 | 0 | 20MS | 0 |
| B | 0 | 10MS | 0 | 0 |
| C | 5MS | 2.5MS | 0 | 3.75MS |
| | | | | |

FIG. -16F-

LUT'S

| | 1 | 2 | 3 | 4 | 5 |
|---|---|---|---|---|---|
| A | 0 | 0 | 0 | 0 | 10MS |
| B | 0 | 10MS | 0 | 0 | 0 |
| | | | | | |

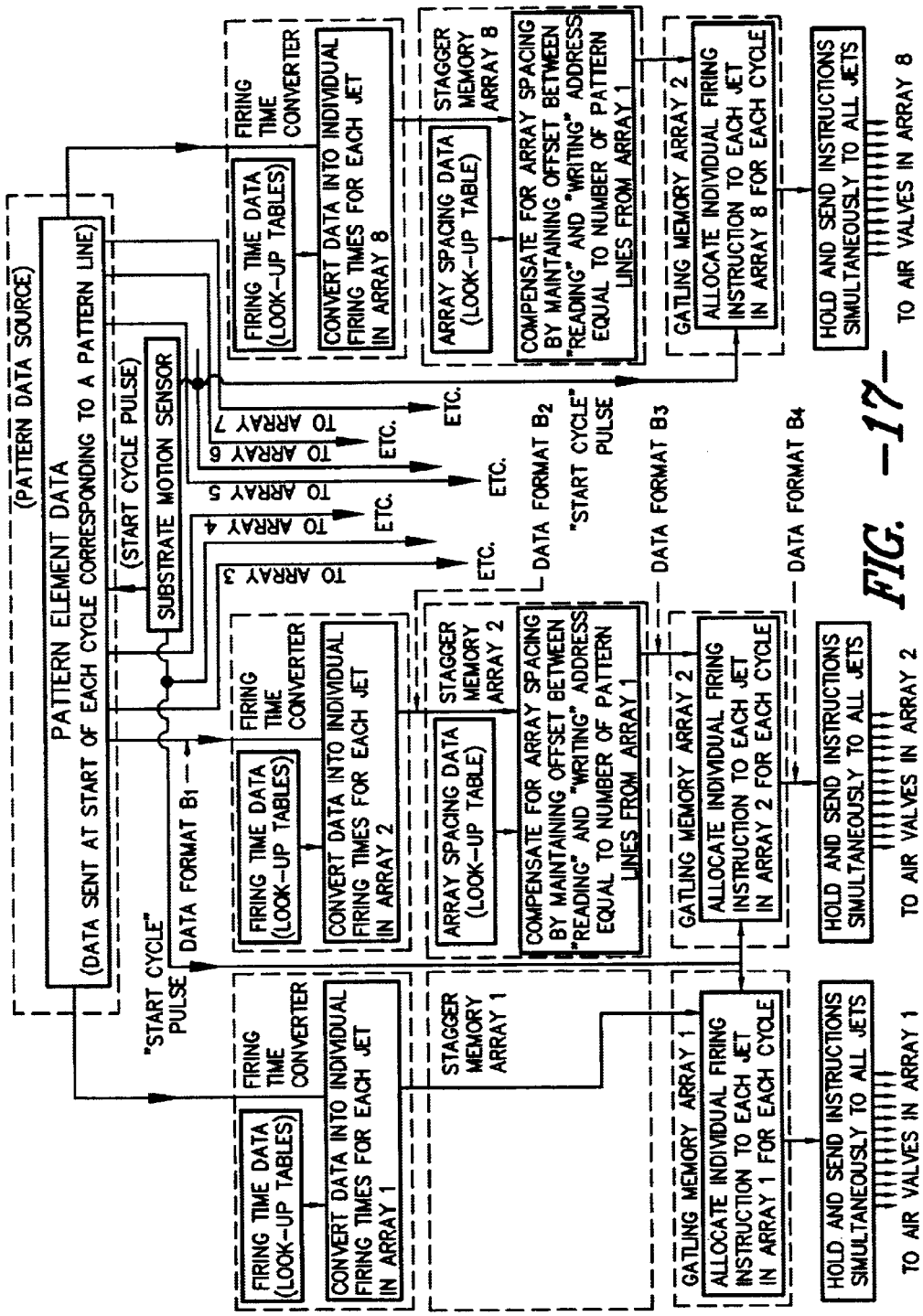
FIG. -17-

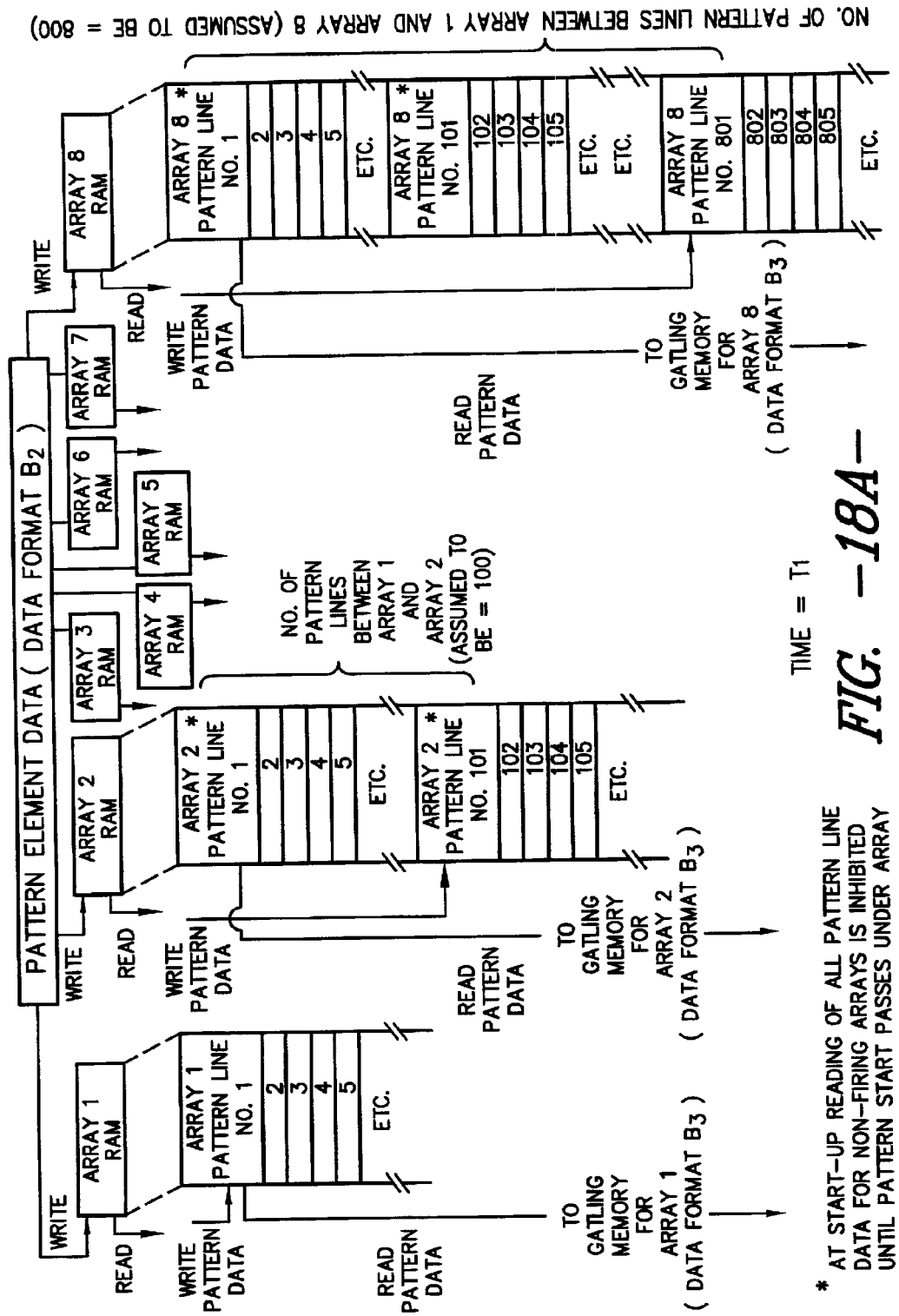
FIG. -18A-

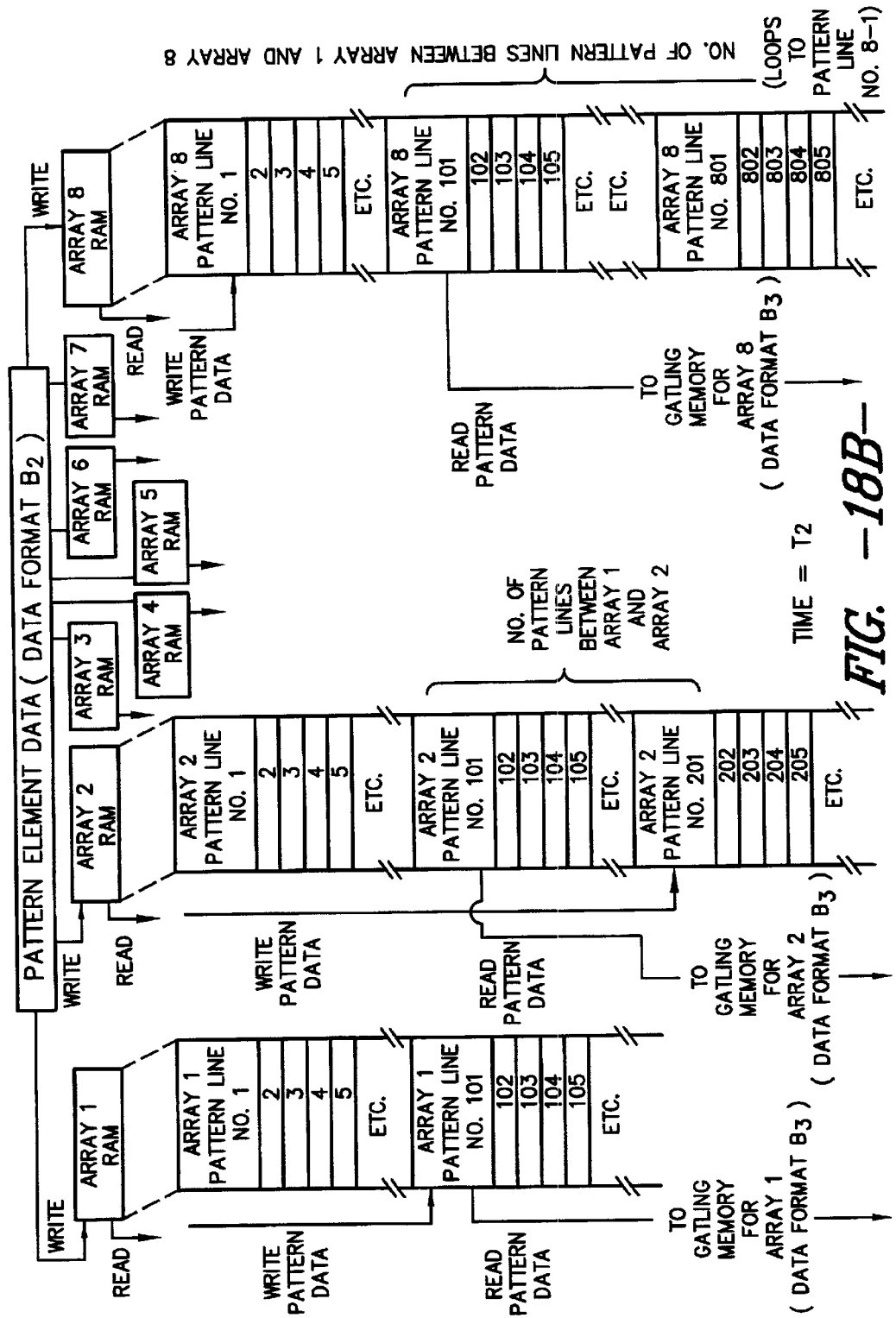
FIG. -18B-

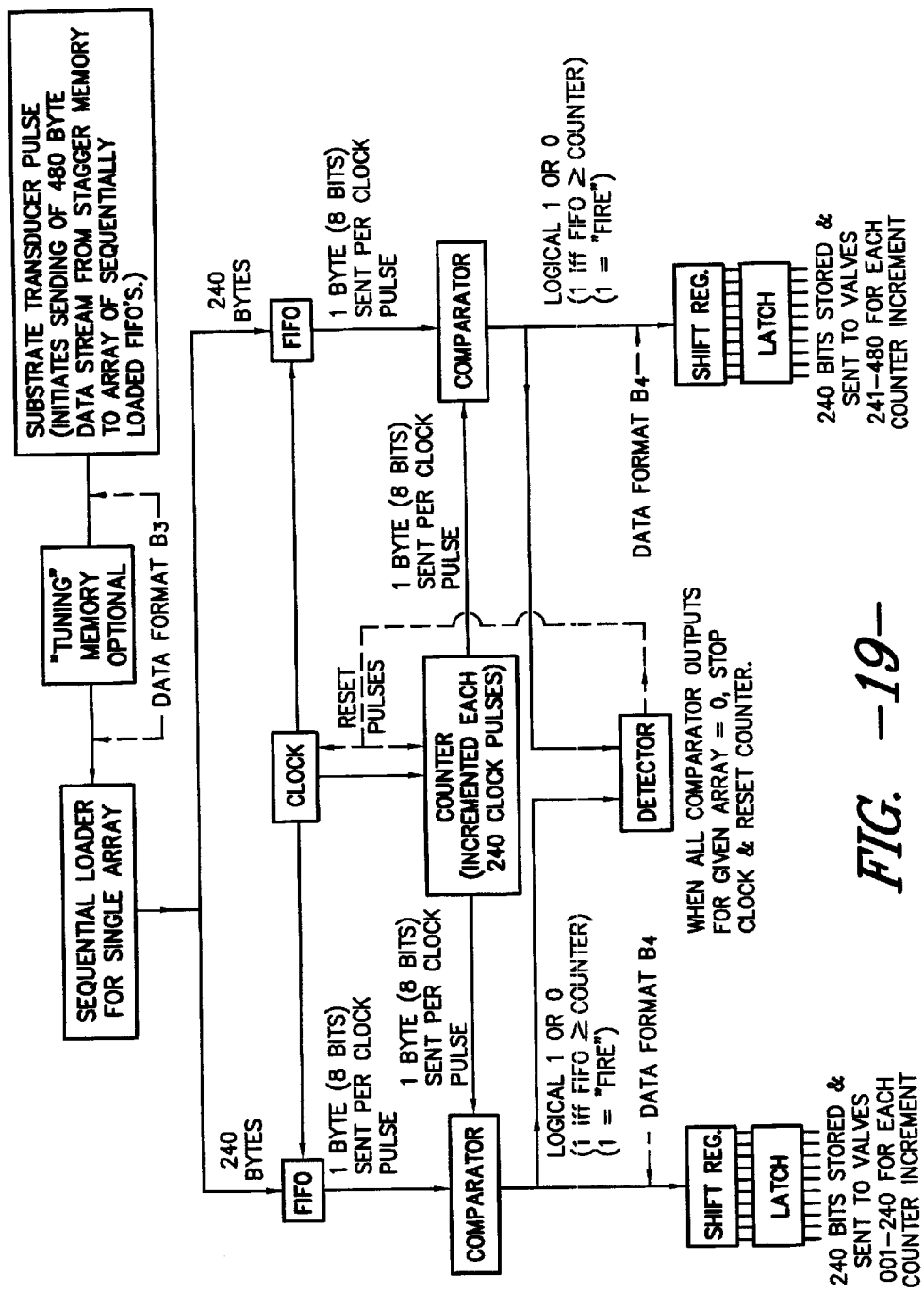
FIG. -19-

FIG. -20-

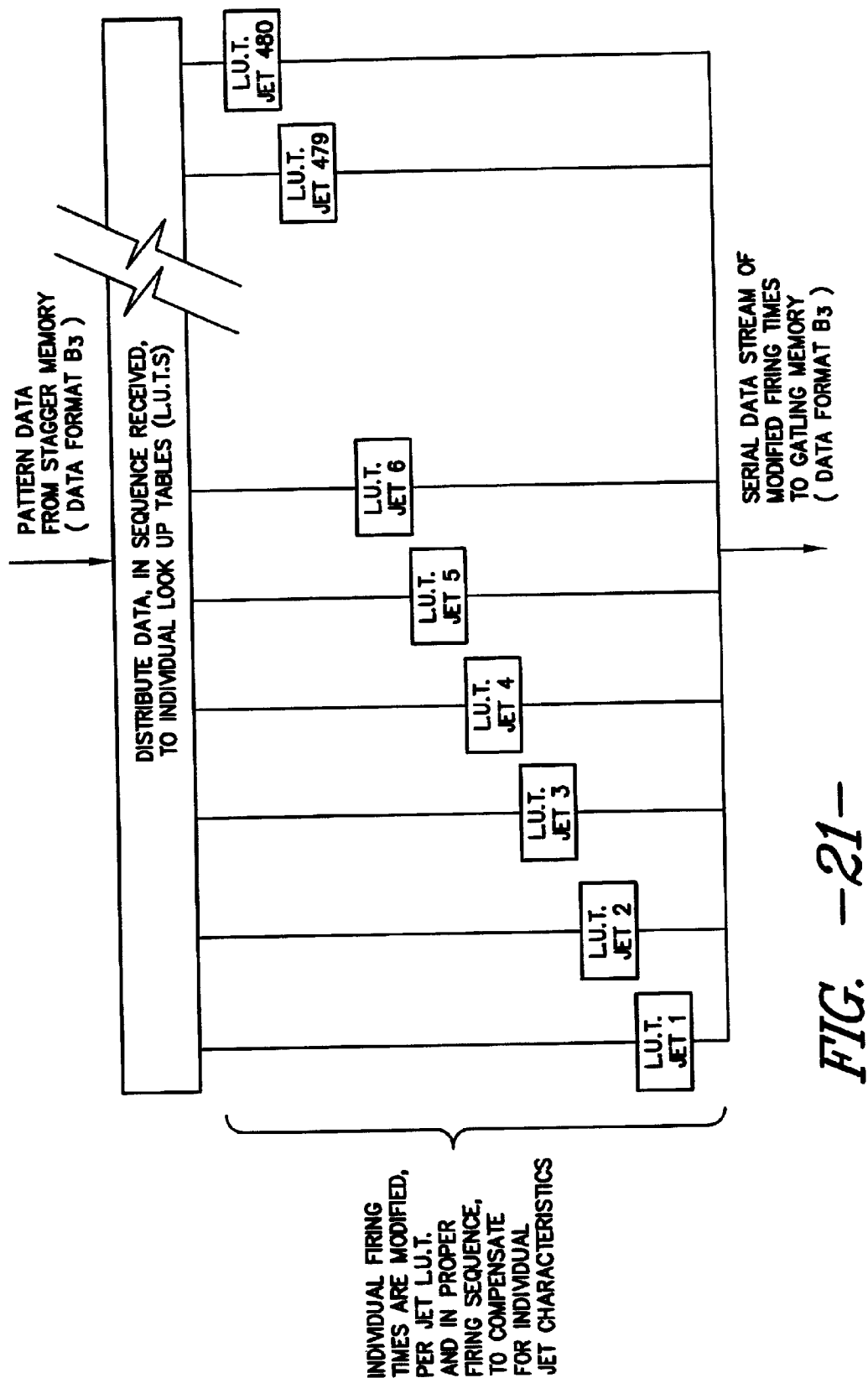
FIG. -21-

CONSTRUCTION OF COLORED IMAGES ON ABSORBENT SUBSTRATES USING A COMPUTER-AIDED DESIGN SYSTEM

This disclosure relates to a computer-assisted process for the design and placement of multi-colored patterns on absorbent substrates using a limited number of transparent process colorants. Specifically, this disclosure relates to a process by which a designer, working with a computer-aided design system, can generate and accurately represent on a computer monitor or similar display a multi-colored pattern, as that pattern would appear on a specified absorbent substrate, using coloring elements comprised of groups of multiple pixels in which process colorants have been mixed in a controlled manner to expand the range of available colors, and to compensate for colorant delivery limitations that prevent the application of small, accurately metered quantities of colorant. In an embodiment incorporating the process disclosed herein, specific actuation instructions for a specific dye injection machine capable of patterning a moving textile substrate may be generated.

BACKGROUND

Of the various methods that may be used to apply a pattern of colorants (e.g., dyes) to a textile web, arguably the most versatile method involves the pixel-wise application of measured quantities of liquid colorants, under the control of a computer containing a patterning program, to form multi-colored patterns using a predetermined set of primary or process colors. Examples of such pattern generation techniques may be found in commonly assigned U.S. Pat. Nos. 4,033,154; 4,116,626; 4,545,086; 4,984,169, and 5,195,043, hereby incorporated by reference herein.

Although the teachings herein are not limited to such machines, the machines embodying the patterning techniques described in the above-listed patent documents are particularly well-adapted for patterning webs of textile substrates. Such machines are characterized by a series of fixed, linear arrays or "color bars" comprised of a plurality of individually controllable liquid colorant applicators or jets, each array being supplied by a respective liquid colorant supply system carrying liquid colorant (a "process colorant") of a specified color (known as a "process" color). The arrays are positioned in parallel relationship, spanning the width of the path taken by the substrate to be patterned, and the arrays are generally perpendicular to the direction of web travel.

As the substrate moves along its path, it passes under each of the arrays in turn and receives, at predetermined locations on the substrate surface (i.e., at the pixel locations specified by the pattern data), a carefully metered quantity of dye from one or more of the dye jets spaced along the array or color bar. The control system associated with the machine provides for the capability of delivering a precise quantity of dye or other liquid colorant (which quantity may be varied in accordance with the desired pattern) at each specified location on the substrate as the substrate moves under each respective array, in accordance with electronically defined pattern information.

Because the jets on each array are capable only of dispensing the liquid dye supplied to that array, the maximum number of different colors that can be directly applied to the substrate by the machine (i.e., the maximum number of process colors) in a given pass can be no greater than the number of arrays. Additionally, due to the physical limitations associated with the individual liquid dye applicators, there is some non-zero minimum quantity of colorant that can be accurately and repeatedly metered onto the substrate, typically representing the limit as to how quickly the valves controlling colorant delivery can be made to turn on and off. This becomes an important issue when the pattern color to be reproduced requires a combination of process colors having a relatively low proportion of a certain colorant (e.g., "Colorant A"), and the patterning system cannot deliver Colorant A to that specific pattern location except in an amount that significantly exceeds the quantity needed. These two conditions—a limited number of process colorants and a minimum colorant delivery system—represent limitations to the range of colors that can be represented on the substrate. Unless specifically stated otherwise, the terms "dye" and "colorant" shall be used interchangeably herein to indicate a liquid colorant that is intended to include, but is not necessarily limited to, textile dyes.

A recurring challenge associated with such devices having a limited number of process colorants is devising ways to allow for the reproduction of the widest possible range of colors (i.e., reproducing the maximum number of different target colors) from a given set of conditions, i.e., the given set of process colorants and the minimum colorant delivery limitation. Among the techniques used in the graphics arts industry to extend the range of reproduced colors from a limited number of process colors (which, in the patterning devices discussed above, correspond to the number of arrays or color bars) are two techniques that shall be referred to herein as (1) dithering and halftoning techniques and (2) in situ bending techniques.

Briefly, dithering and halftoning techniques involve the use of pixels (pattern elements), usually of varying colors, that are arranged in checkerboard-like patterns to simulate, when viewed at a distance, the appearance of colors that are not represented by process colorants. For example, various shades of gray may be constructed by a checkerboard of small black and white print dots of different relative sizes. Where necessary for clarity, this discussion will distinguish dithering techniques, which are sometimes associated only with pattern areas in which the color is non-uniform, from halftone techniques, useful in pattern areas in which a continuous or uniform color is desired. In the latter, a group of pixels (i.e., a superpixel) that collectively expresses the proper color is tiled, as a repeating unit, into the appropriate pattern areas. In situ blending techniques, as used herein, involve the physical mixing of colorants within individual pixels or groups of pixels (i.e., superpixels) to generate colors that are not represented by process colorants.

Traditional dithering and halftoning techniques are based upon the phenomenon that a target color for which no exact match is available among the process colors can be visually approximated, often to a high degree of accuracy, by the juxtaposition of several individual pixels, each having a color that expresses a visual component of the desired or target color. When viewed at an appropriate distance, the eye tends to visually integrate or blend the individual contribution of each pixel in this group of adjacent pixels and provides the perception of the target color that, in reality, has been "constructed" from a mosaic of individual component colors (additive color mixing). However, note that even in traditional printing systems new colors are produced when print dots overlap. In addition, as further elaborated below, colorants in neighboring pixels mix together in some print systems. In the latter case, the individual pixels create a new color (subtractive color mixing) that can be spatially uniform.

An in situ blend shall refer to the color of the physical combination of two or more colorants that occupy at least portions of the same pixel-sized location on a substrate, as viewed at the individual pixel level. The additional colorants might have been applied to that pixel by the patterning device, or the additional colorant(s) might have migrated from an adjacent pixel. Accordingly, if the color green is to be reproduced in a given area and only yellow and blue colorants are available as process colors, the designer may (providing the patterning device is capable) elect to deliver, in a specified sequence, a predetermined quantity of yellow and a predetermined (and not necessarily equal) quantity of blue to each pixel in that area, to form the desired color green in each of the pixels comprising that area, rather than constructing the green using halftone ("checkerboarding") methods.

Consistent with the above, as used herein the term "pixel" shall refer to the smallest area or location in a pattern or on a substrate that can be individually addressable or assignable with a given color. Alternatively, if clear from the context, the term "pixel" shall refer to the smallest pattern element necessary to define the line elements of the pattern to a predetermined level of detail, analogous to the pixel counts in imaging device resolution specifications (e.g., "1280× 1024").

Both dithering/halftoning and in situ blending techniques are well suited to systems in which the reproduced patterns are comprised of small quantities of different colorants that are deposited in contiguous, pixel-wise fashion, across the surface of the substrate, whether or not the colorants are dispensed from fixed color bars. While both of these techniques may be employed separately, these two techniques can be combined to form a much wider range of reproducible colors that would be possible by using either technique alone.

The term "perceived color" shall refer to the color of a small area of a substrate in which a target color has been reproduced using dithering techniques, wherein the colors of adjacent individual pixels are visually integrated by the eye of the observer to form a visual blend that is perceived as the target color.

The term "target color" will refer to the desired observed color to be reproduced within the pattern on the substrate. The term "process color" will refer to the inherent color of the individual, unblended dye or other colorant that may be directly applied in pixel-wise fashion to the substrate by the individual dye jet; comprising a given array. Note that the same process colorant may have a different visual appearance on different substrates, due to inherent substrate color, substrate texture, etc.

For purposes of the following discussion, an arrangement of "N" individual pixels of various colors (two, three, or more) in a checkerboard-like array to simulate color as the result of a dithering or halftoning process shall be referred to as a "structural blend." A "pure" structural blend shall be one in which no more that one process color has been applied to each pixel. For example, to generate the color green using only blue and yellow colorants in a pure structural blend, alternating "checks" (i.e., pixels) of 100% blue and 100% yellow may be used to yield a localized pattern comprised of a 50%/50% blend of blue and yellow. Note that the total amount of colorant delivered to each pixel does not exceed 100%, the absorptive capacity of the substrate.

As mentioned above, where an extremely broad range of target colors must be created from a limited number of available or primary colors, it has been found advantageous to form dithered structures that are comprised of individual pixels in which in situ blending may have occurred. Such in situ blending may be the result of migration of colorants from one pixel containing a colorant to an adjoining pixel containing a different colorant ("inter-pixel blending"), the direct application of two or more different colorants within the same pixel ("intra-pixel blending"), or a combination of these two techniques, in which the inter-pixel colorant migration involves at least two pixels into which two or more individual colorants have been delivered by the patterning device. This provides for the possibility that, within a dithered structure, some pixels may carry the color of a process color, while others may carry a color that is the result of the physical blending of two or more of the process colors. Dithered structures in which at least some of the individual pixels comprising the checkerboard "checks" are colored by the presence of two or more different process colorants in the same pixel shall be referred to as "hybrid" structural blends.

The term "superpixel" shall be used to describe a group of "N" pixels, most commonly, a square array of pixels (e.g., 2×2, 3×3, 4×4, etc.), that is created by an appropriate halftoning algorithm as a unit, i.e., the multi-pixel group is treated as a single large pixel, having, for dithering purposes, an assigned dithering palette color dictated by the color and arrangement of the individual pixels of which it is comprised. If, for example, medium blue and black colorants have been applied in alternating fashion to the constituent pixels of the superpixel, the superpixel will appear to have a dark blue color. This dark blue superpixel then may be used by an appropriate dithering algorithm in the same manner that an individual pixel, carrying a "process" color of dark blue, would be used.

Superpixels may be used once during dithering, or many times, as a repeating unit that is "tiled" or geometrically replicated over an area of the pattern that is required to carry a uniform color that cannot be reproduced using process colors and single-pixel color blending techniques (e.g., in-situ blending). For discussion purposes herein, it shall be assumed that the superpixel shall not be comprised of so many individual pixels N as to preclude the uniform migration of dye throughout the superpixel. Where this assumption is not valid, the resulting superpixels may tend to exhibit a noticeable degree of unevenness or non-uniformity of coloration, often referred to as "heather" or "granularity," that may be aesthetically undesirable. In the practice of the instant method, N values of 9 and 16 have produced acceptable results, although it is known that, generally speaking, larger values of N tend to produce heather, stippling, or other pattern artifacts. The threshold value of N for which this condition holds will depend upon the nature of the substrate, the quantity and viscosity of the applied inks or dyes, the patterning technique used, etc. Conventionally, the total colorant concentration assigned to any individual pixel comprising a superpixel is limited to about 100% in order to discourage excessive colorant migration outside the pixel, as well as to avoid potential drying problems, etc. The term "concentration" is an expression of the percentage of total substrate volumetric absorption capacity taken up by the colorant, and is not an expression of the relative dilution or chromophore content of the liquid colorant—i.e., a colorant applied to a pixel at a 50% concentration means that the pixel has been saturated to one half the absorptive capacity of the substrate to absorb colorant at that location, and additional colorant(s) may be applied, up to a limit of 100% concentration, without exceeding the nominal absorptive capacity of the substrate at that location.

In cases where the absorptive capacity of the substrate is exceeded, further opportunities to expand the range of reproduced color become available. A superpixel in which the 100% maximum colorant absorptive capacity of some pixels are exceeded shall be referred to as a metapixel. Colors of a metapixel can depend heavily upon the controlled physical mixing or blending of colorants beyond the boundaries of certain individual pixels within the metapixel. To form a metapixel, liquid colorant is applied in unequal quantities to adjacent pixels, the objective being to selectively oversaturate certain pixels (i.e., achieve a colorant concentration greater than 100% within those pixels) and, at the same time, undersaturate other, adjacent pixels (i.e., restrict the colorant concentration to less than 100% within those pixels), so that the overall colorant concentration of the metapixel is maintained at a desirable level. The average concentration of colorant within any superpixel, including a metapixel, preferably is maintained at no more than 100% to avoid any of the undesirable effects of substrate oversaturation (e.g., difficulty in fixing or drying, uncontrolled migration of colorants, etc).

It should be understood that the color-forming techniques described herein are not limited to the specific patterning systems described above. For example, an arrangement of liquid colorant (e.g., dye) applicators, perhaps grouped in terms of color to be applied, may be physically moved or traversed across the path of a sequentially indexed substrate while selectively dispensing measured quantities of colorant onto the substrate at pre-defined locations. Although such arrangement is distinct from the fixed array systems discussed above, it is believed that the teachings herein are fully applicable to and adaptable for use with any such automated systems in which dye or colorant delivery can be controlled to the extent necessary to place reliably a pre-defined quantity of one or more liquid colorants at pre-specified locations on an absorbent substrate. Alternatively, it is contemplated that the techniques described herein could be applied to patterning systems using print screens with absorbent substrates. In all cases the substrate must be sufficiently absorbent to permit a superpixel size within which inter-pixel dye migration is essentially complete. For example, bond paper is generally not absorbent enough to qualify as a satisfactory substrate in this regard.

It also should be understood that the techniques described herein are applicable to the patterning of a variety of absorbent substrates, but will be described in terms of an absorbent substrate such as a textile substrate. Furthermore, while carpet substrates are specifically discussed herein, it should be understood that other textile substrates, such as decorative or upholstery fabrics, or other absorbent substrates, may also be used, with appropriate modifications to the processes discussed below that would naturally occur to one skilled in the art.

SUMMARY OF THE INVENTION

The above description is directed to the various ways to expand the range of reproducible colors that can be formed from a limited number of process colors, and to accommodate physical limitations in the delivery of small quantities of colorant to specific locations on the substrate. The following discussion will reveal how a designer can substantially automate the process of developing arrangements and blends of process colors, particularly through the use of superpixels, to successfully reproduce a wide range of target colors on a specific absorbent substrate and effectively overcome the obstacles associated with the limited range of process color availability and inadequate colorant delivery response times.

The processes disclosed herein provide a comprehensive capability whereby superpixel structures can be constructed automatically to render a wide range of designer-developed colors, and those colors can be accurately predicted and portrayed in pattern areas for designer review on a computer monitor. Additionally, such colors can be made a part of the dithering palette of an appropriate dithering program. Accordingly, the teachings herein provide the designer or artist with a substantially automated technique through which an existing set of process colors can be used to generate a significantly larger range of colors that would otherwise be available only through the highly labor-intensive process of manually constructing individual pixel structures.

To be of maximum benefit to the designer or artist, it is believed that any computer-based design system of the kind disclosed herein should address the following major requirements: (1) colors are specified by the designer only as relative concentrations of process colors; (2) colors must be accurately rendered on the design station display as they would appear on the substrate of interest; (3) colors must be convertible into superpixel structures that reproduce the color without manual intervention by the designer, i.e., the type of superpixel—solid shade, intra-pixel blended, "pure" structural, "hybrid" structural, or metapixel—and the portioning out of colorants to specific pixels must be fully automated; and, optionally, (4) the resulting superpixel structures should be translatable into patterning device instructions in a seamless manner, thereby extending the efficiency of the design process into the manufacturing process. This disclosure addresses each of these requirements, in the context of the overall pattern generation and reproduction process.

The color resulting from the application of a colorant to a substrate is influenced by the nature of the substrate. Accordingly, in order to predict with accuracy on a computer monitor the visual result of applying one or more colorants—blended or unblended—to an absorbent substrate, it is essential to account for certain physical properties of the substrate. In accordance with the teachings herein, Kubelka-Munk color blending theory is used. This theory utilizes the substrate's light absorption and light scattering properties to calculate a reflectivity parameter for each colorant, which may then be used to predict the relative contribution of each component of a mixture of process colorants, and thereby predict (and represent on a computer monitor) the appearance of the colorants and colorant blends on the substrate. As extended in accordance with the teachings herein, Kubelka-Munk color blending theory has been found to be useful in determining the result of single or multiple dye applications (in any sequence) within a given pixel, and evaluating the effects of dye migration between the contiguous pixels that make up the superpixel.

A classic challenge associated with color blending is referred to as the "inverse blend" problem: while it is possible to calculate, using the techniques disclosed herein, the resulting color of a specified combination of colorants, applied in a given proportion and sequence, it is substantially more difficult to determine the colorant components and application sequence necessary to best reproduce a selected target color. While one set of blend concentrations will result in only one blend color (as defined by a color space, say, RGB values), the same blend color (again, defined by a color space, say, RGB values) generally may be produced by an infinite set of different blend concentrations. To overcome this problem, the innovative technique herein provides that, while process colors are specified in terms of RGB values for purposes of visual feedback, blends of process colors are specified by the designer in terms of concentrations (i.e., percent of total substrate absorptive capacity), rather than RGB values. By doing so, the problem of determining the best possible combination of dyes and proportions of dyes that will result in the desired color (expressed in RGB values)—the inverse blend problem—is eliminated.

As an additional advantage of this technique, the designer/artist is provided with the ability to adjust color by increasing the concentration of colorant, an intuitive process that is analogous to adjusting the quantity of each different "paint" applied to a given area and that allows the designer/ artist to better utilize his or her experience in conventional painting. Additionally, the teachings herein include a process which automates the construction of a superpixel having the desired target color. Mixtures of process colors are automatically constructed and then arranged within a superpixel structure so as to yield the desired overall color while minimizing patterning artifacts, and the results may be accurately portrayed on the design station monitor. While commercial systems like Adobe Photoshop® permit color specification through relative colorant concentrations (e.g., CMYK values), such systems generally are not applicable to printing on absorbent substrates due to a variety of technical considerations, including one or more of the following: the systems cannot take into account colorant stratification in the substrate when predicting colors for computer display, the systems do not provide for the formation of superpixels, the systems do not permit the use of arbitrary process colors, the systems cannot accommodate the use of metapixels, and the systems require that samples of all possible colors be printed and measured before accurate color display is possible.

Upon designer approval, the computer monitor image, as rendered by the graphics arts software, then may be translated into specifications or operating instructions for the patterning device. This process, when used with appropriately compatible automated hardware, is capable of providing for the automated manufacture of the patterned substrate, as that patterned substrate appeared on the designer's monitor.

BRIEF DESCRIPTION OF THE DRAWINGS

Details of the method disclosed herein will be explained with the aid of the accompanying Figures, in which FIG. 1 schematically depicts one example of a prior art computer-controlled dye injection patterning device that is suitable for patterning textile substrates in accordance with the teachings herein.

FIG. 2A is a flow chart describing an overall automated process for generating superpixels to be used as halftone elements that are tiled within the pattern area to form a substantially uniform color.

FIG. 2B is a flow chart describing an overall automated process for generating superpixels to be used as dithering elements to be placed within a pattern area exhibiting a non-uniform color, in accordance with the teachings herein.

FIGS. 3A through 3C depict a flow diagram of the Color Blending Algorithm ("CBA"), referred to in FIGS. 2A and 2B, for predicting the observed color resulting from the application of one or more transparent colorants to a specified pixel on a substrate. The pixel may or may not be part of a superpixel. While the flow diagram refers to "dye," the teachings herein, including the use of this algorithm, are applicable to the use of other transparent colorants, and the terms "dye" and "colorant" as used throughout this discussion should be considered as synonyms for any liquid transparent colorant.

FIG. 4 describes, in flow chart form, the Averaging Algorithm (see Blocks 50 and 45 in FIGS. 2A and 2B, respectively) used to determine the colorant content of a constructed superpixel exhibiting a specified color.

FIGS. 5A and 5B represent an overview, in flow chart form, of the Halftone Construction Algorithm (see Blocks 60 and 55 in FIGS. 2A and 2B, respectively), useful in allocating colorant to specified pixels within a superpixel so as to minimize patterning artifacts.

FIG. 6 depicts the succession of clockwise rotations of colorant layers used by the Halftone Construction Algorithm to reach an optimum (i.e., most uniformly distributed) placement of colorants within a 2×2 superpixel.

FIG. 7 diagrammatically depicts an example of the operation of the Averaging Algorithm and the Halftone Construction Algorithm, showing the required colorant proportions (expressed in concentrations), the initial and final colorant placements of each colorant within the superpixel, and the resulting superpixel composition, for a structural-type superpixel.

FIG. 8 diagrammatically depicts an example of the operation of the Averaging Algorithm and the Halftone Construction Algorithm, showing the required colorant proportions (expressed in concentrations), the initial and final colorant placements of each colorant within the superpixel, and the resulting superpixel composition, for a metapixel-type superpixel.

FIG. 9 is a schematic side elevation view of the apparatus of FIG. 1 showing only a single dye jet color bar and its operative connection to a liquid dye supply system as well as several electronic subsystems associated with the apparatus.

FIG. 10 is a block diagram disclosing, in overview, an electronic control system of the prior art;

FIG. 11 schematically depicts the format of the pattern data at the previously known data processing stages indicated in FIG. 10;

FIG. 12 is a block diagram illustrating a prior art multiprocessor and pattern control system environment in which the present invention may operate.

FIG. 13 is a flow chart relating to one prior art method by which look-up tables may be generated for using the patterns developed herein to direct a patterning device.

FIG. 14 is a continuation of the flow chart of FIG. 13.

FIGS. 15A–15D illustrate a firing time table, machine color table, pattern color table and look-up tables, respectively, for a prior art method by which the patterns developed herein may be implemented by a patterning device.

FIGS. 16A–16F illustrate further examples of prior art look-up tables to be used in connection with the patterns developed according to the teachings herein.

FIG. 17 is a block diagram disclosing, in overview, a prior art electronic control system that may be used in connection with the patterning device disclosed herein.

FIGS. 18A and 18B are diagrammatic representations of the prior art "stagger" memory disclosed in FIG. 17. FIG. 18A depicts a memory state at a time T1; FIG. 18B depicts a memory state at time T2, exactly one hundred pattern lines later;

FIG. 19 is a block diagram describing the prior art "gatling" memory described in FIG. 17;

FIG. 20 schematically depicts the format of the pattern data at various prior art data processing stages as indicated in FIGS. 17 through 19;

FIG. 21 is a diagram showing an optional prior art "jet tuning" function which may be associated with each array, as described herein.

DETAILED DESCRIPTION

The flowchart of FIG. 2A indicates the principal process steps in the generation of a superpixel to be used as a tiling element to color a uniformly colored area of the pattern. While the process of FIG. 2B is analogous to the process of FIG. 2A, discussed below, it should be understood that the process of FIG. 2B constructs a superpixel that is intended for use as a dithering element—i.e., an element that may only be used once or a few times within a given pattern area to express a non-uniform color. Conversely, the process of FIG. 2A is directed to the construction of superpixel that will be replicated and contiguously positioned in tiled fashion to express a uniform color—that of the superpixel. Accordingly, while reference in FIG. 2B is made to the generation of a plurality of superpixels, FIG. 2A is concerned with the generation of a single superpixel that will satisfactorily express a specified target color when tiled within a specified pattern area.

Because the designer may have sufficient confidence in his or her ability to specify the target color, expressed as concentrations of various process colors, without the need to confirm the target color through visual feedback or a computer monitor, this aspect of the process of FIG. 2A (See Blocks 15, Blocks 25 through 40, and Block 70) may be considered optional. It should be understood, however, that many designers will prefer the assurance provide by a visual representation of the target color, as generated by the Color Blending Algorithm ("CBA") of FIGS. 3A–3C, in which case Block 15 and Blocks 25 through 40 are not optional.

Note that the optional steps identified above are not deemed optional if the superpixel is to be used as a dithering element, because most dithering algorithms require specification of color component values (e.g., RGB values) in order to perform their dithering function. Furthermore, because dithering algorithms produce arrangements of pixels that cannot easily be predicted in advance, it is believed that many designers prefer to be able to review the dithered image in advance to determine if it meets his or her aesthetic requirements. The same RGB values specified for dithering purposes can serve the additional function of providing the designer with such visual feedback of the dithered pattern on a computer monitor prior to actually patterning the selected substrate.

In FIG. 2A, the process for generating a superpixel useful in halftone or tiling applications begins with the specification of one or two data sets: (1) $C_{min}$, the minimum colorant concentration value that can be applied to the substrate by the patterning device, which, for purposes herein, shall be assumed to be the same value for all colorants (Block 10), and, optionally, (2) the RGB values for each available process color (Block 15). As discussed above, where the superpixel is to be used as a replicated halftone element (as opposed to a dither element), specification of the RGB values is necessary only if the designer desires visual feedback of his or her choice of target color (Block 15). In Block 20, the designer specifies a target color in terms of a specified proportion of selected process colorants, expressed as a set of colorant concentrations, without reference to RGB values.

Using process color concentration values to specify target colors makes unnecessary any conversion of process colors or target colors to an RGB or similarly-specified color space, unless the designer wishes to have visual confirmation of the target colors on a computer monitor. Assuming the designer desires visual feedback, the Color Blend Algorithm ("CBA") of FIGS. 3A–3C may be used to calculate and display the visual result of that specific combination of colorants, at the specified concentrations and on the substrate of interest, for designer approval (Blocks 25 through 40). For discussion purposes, following approval of the rendering of the proposed color generated by the Color Blend Algorithm (Block 40), the designer then specifies the size of the superpixel, i.e., how many pixels ("N") it will contain (Block 45), although in other embodiments the choice of N may be made prior to Block 45.

Having specified the size and the color of the proposed superpixel, the Averaging Algorithm, described in detail in FIG. 4, computes the quantities of individual colorants necessary to produce the target color for the pixels comprising the superpixel (Block 50). Having computed the required quantities of colorants, a check is made to confirm that N is large enough so that the need for metering very small quantities of colorant to produce certain required colorant mixtures, as perhaps manifested by limitations on colorant applicator response time, will not be a limiting factor for printing the target color (Block 55). When N is confirmed to be sufficiently large to present no limiting factor, the Halftone Construction Algorithm ("HCA"), described in detail in FIGS. 5A and 5B, is used to arrange the colorant amounts applied to the individual pixels comprising the superpixel in a way that will maximize the uniformity of the colorant distribution within the superpixel (Block 60), allowing its use as a tiling or halftone element capable of expressing the target color.

Continuing with Block 65 in FIG. 2A, the constructed superpixel is then used as a tiling or halftone element and is placed within the pattern area. Block 70 describes an optional process step in which the pattern may be displayed using superpixels in which the individual constituent pixels are displayed prior to any commingling of colorants within the superpixel. This process step would be useful if, for example, the designer wanted to review in detail the interaction of the superpixel colorants with adjacent pixels for the purpose of reducing or enhancing the contrast of pattern details, etc. In Block 75, if additional pattern areas require coloring, a new target color is selected (Block 20) and the process, beginning with Block 25, is repeated. When all pattern areas have been colored, the pattern can be transformed into appropriate instructions for the patterning machine of choice (Block 80), perhaps in accordance with the teachings of commonly assigned U.S. Pat. Nos. 4,mi984, 169 and 5,195,043.

FIG. 2B is directed to the construction of superpixels to be used as dithering elements. Block 10 represents the same process described in connection with the corresponding Block of FIG. 2A—the specification of $C_{min}$, the smallest quantity of colorant that can be accurately and reliably delivered to a given pixel-sized area on the substrate. In this process, however, because RGB values are required for use by the dithering algorithm, the RGB values for the process colors are specified as well (Block 15). Block 20 represents the specification by the designer of the various combinations and concentrations of process colorants that will comprise the dithering palette used by the selected dithering algorithm. Optionally, but preferably, this process may be automated to some degree. Note that the dithering palette normally will contain colors that, because of the $C_{min}$ constraint, cannot be generated except through the use of multi-colored superpixels.

In Block 25, the RGB values for all such combinations (process colorants and all blends of process colorants specified by the designer), as they will appear on the substrate of choice, may be calculated by the Color Blending Algorithm of FIGS. 3A–3C, which will be described in more detail below. In Blocks 30 and 35, the designer has the opportunity to observe the pattern as it has been rendered by the dithering algorithm using the dithering palette colors, and to compare it to the pattern envisioned by the designer. Upon approving the rendering of the pattern by the selected dithering algorithm (Block 35), the designer then specifies the size of the superpixel, i.e, how many pixels ("N") it will contain (Block 40).

It should be noted that, if the dithered pattern uses only colors for which the formation of superpixels is not required (e.g., all colors actually used by the dithering algorithm can be generated using process colors or single-pixel blends of process colors), then there is no need to form a multi-colored superpixel and, theoretically, there is no need to proceed to Blocks 40 through 55. In many cases, however, the dithering algorithm will select at least one color from the dithering palette that requires the formation of a superpixel, and the process will proceed to Block 40. Contrariwise, if a superpixel is required in which all constituent pixels receive the same combination of process colors, it is constructed seamlessly as a superpixel comprised of identical individual pixels. In the preferred embodiment shown in FIG. 2B, the formation of superpixels for all dithering palette colors is assumed, even for dithering palette colors that express process colors, simple 50/50 blends of two process colors, etc. This will result in the formation of dithered patterns comprised exclusively of superpixels. Because such superpixels are larger than individual pixels, appropriate scaling of the pattern, as will be evident to those skilled in the art, might be required.

Having specified both the size and the desired colors of the superpixels, the Averaging Algorithm, described in detail in FIG. 4, then computes the quantities of colorants necessary to produce the palette colors for the pixels comprising the superpixels (Block 45). A check is then made to confirm that N is large enough so that the need for metering very small quantities of colorant to produce certain required colorant mixtures, as perhaps manifested by limitiations on colorant applicator response time, will not be a limiting factor for printing the palette colors (Block 50). If N is found to be too small, a larger value for N may be selected (Block 40) and a new, larger superpixel that meets the requirements of Block 50 may be constructed using the Averaging Algorithm of FIG. 4.

The Halftone Construction Algorithm ("HCA"), described in detail in FIGS. 5A and 5B, is then used to arrange the colorant amounts applied to the individual pixels comprising the superpixel in a way that will maximize the uniformity of the colorant distribution within the superpixels, allowing their use as dithering elements capable of expressing the colors in the pattern (Blocks 55–60), with optional visual confirmation on a computer monitor (Block 65). When all pattern areas have been colored to the satisfaction of the designer (Block 70), appropriate patterning instructions, e.g., in the form of colorant applicator actuation instructions, may be generated and sent to the patterning machine for execution.

Once the superpixel that creates the desired color is created, it may then be used as a dithering element in a conventional dithering algorithm. It is believed that any of several different dithering algorithms, including adaptive algorithms, may be used to yield satisfactory results. For example, it is believed that algorithms based upon the work of Thiadmer Riemersma, as described in "A Balanced Dithering Technique," appearing in the December, 1998 issue of C/C++ User's Journal are generally suited to this application. The Riemersma dithering algorithm is one that, because it can reduce a color image using any available color palette and because it restricts the influence of a dithered pixel to a small area around it, may be thought of as combining advantages of ordered dithering schemes (localized influence) and error diffusion dithering schemes. However, the Riemersma algorithm may tend to produce results that are somewhat grainy in appearance. Alternatively, and in most cases preferably, a popular error diffusion dithering algorithm known in the prior art as Floyd-Steinberg dithering and described, for example, in the an article appearing at Page 253 of the Mar. 28, 1995 issue of "PC Magazine" may be found to produce smoother results. Where use of Floyd-Steinberg dithering produces excessive pixelation, Riemersma dithering may be preferred. It is believed that other dithering algorithms known in the prior art, such as those available in Adobe Photoshop® or similar graphics software, may also yield satisfactory results.

It will be understood by those skilled in the art that the use of groups of pixels in place of individual pixels might require appropriate scaling of the pattern or image to be reproduced, to assure that the areas in which superpixels are used will maintain the proper relationship to those areas in which individual pixels are used. Where, for example, 2×2 superpixels are used within a pattern, the entire pattern preferably might be enlarged by a factor of two in each dimension, a condition that may lead to objectionable granularity of the final pattern when reproduced. Additionally, as will be readily appreciated by those skilled in the art, it should be noted that the order in which many of the process steps set forth in FIGS. 2A and 2B is, to some degree, discretionary. Accordingly, it is foreseen that the sequence in which the processes described in the individual process Blocks of FIGS. 2A and 2B may be changed without departing from the teachings herein. As an example only, the selection of N, the size of the superpixel to be constructed, can be made earlier in the overall process.

As one of the initial steps set forth in FIGS. 2A and 2B, a set of liquid colorants is selected, each colorant having a different color. These colors become the "process" colors, which, in various combinations, will form all the halftone structures, colorant blends, and dithering palettes available to the designer. The task of predicting, with accuracy, the color of a specific combination of such colorants on a specific absorbent substrate is challenging. It is a task that is not readily accomplished with standard graphics arts software, although such software typically contains an algorithm that can produce generally acceptable results for certain situations (e.g., screen printing on flat, relatively non-absorbent surfaces). At best, such software requires measurements of sample colors that are then stored in data bases. Stored color measurements are then displayed in pattern areas as the need arises. Therefore, such a scheme requires the manufacture of blend samples.

Alternatively and preferably, the Color Blending Algorithm discussed above and described in more detail below may be used. In using this technique, the colorant combinations are predicted by beginning with RGB values provided by the designer based upon visual matches to samples for the process colors (and the inherent color, if any, of the substrate), or by converting measurements such as those made by a spectrophotometer into RGB values. The target color is specified by the designer using relative concentrations of process colorants. Then, using RGB values and relative concentrations for the process colors in the Color Blending Algorithm described below, RGB values for all reliable blends of such process colors, as they would appear on the substrate of interest (i.e., with compensations for substrate color as well as the various physical characteristics that are collectively parameterized through the use of values for "WICK" and "DENSITY"), may be mathematically computed and displayed on a computer monitor to provide the designer with the opportunity to inspect the selected colors with a degree of accuracy and reliability that far exceeds the techniques available through commercial software.

A flow diagram of a preferred color blending algorithm, partly based on Kubelka-Munk Theory (see, e.g., James H. Nobbs, "Kubelka-Munk Theory and the Prediction of Reflectance," Ref. Prog. Coloration 15 (1985), Pages 66–75; see also, e.g., Rolf G. Kuehni, Color—An Introduction to Practice and Principles, John Wiley & Sons, 1997), is shown in FIGS. 3A through 3C. Typical input values for this algorithm are discussed below.

Generally speaking, the Kubelka-Munk relationship relates, in relatively simple terms, the light absorption and light scattering behavior of a material to its reflectivity at each wavelength of light. For opaque materials (such as most textile substrates), the relationship may be expressed as follows:

$$k/s=(1-r)^2/2r$$

This formula effectively models the "k over s" or "k/s" parameter, which represents the ratio of a material's light absorption coefficient "k" and its light scattering coefficient "s" at some specified wavelength to the light reflectivity "r" of the material (colored or uncolored).

As is appropriate for non-pigment printing of textile substrates (i.e., printing involving the use of transparent colorants), the color blending algorithm disclosed herein assumes that the light scattering for a given dyed substrate is due only to the substrate and is therefore relatively constant. Importantly, because k and s are proportional to the number of light absorbers and scatterers, these parameters have been found to scale linearly for purposes of computer aided design and may be added for each applied dye. Other physical characteristics such as unused substrate dye capacity (see inputs to algorithm) may also be accommodated. In cases where stratified, transparent colors (i.e., as achieved through use of colorants that absorb, but do not scatter, light) are applied to light scattering media (e.g., textile substrates such as fabrics or carpets), use of Kubelka-Munk theory in the manner disclosed herein results in an unusually good prediction of the resulting color (blended or unblended), as that color would appear on the specified substrate. Kubelka-Munk theory, as extended herein, is not nearly so well suited to situations in which light scattering colorants are placed on the surface of a substrate with relatively little absorption, as on paper in processes like computer-controlled ink jet printing applications.

The Color Blending Algorithm disclosed herein introduces the effects of a variety of such substrate properties by the use of two user-specified parameters particularly applicable to textile substrates: (1) WICK, a user-specified parameter intended to accommodate a variety of physical characteristics, such as viscosity of colorant solutions, capillary structure of the substrate, yarn or pile lay, twist, and compaction, and the surface tension of the colorant solution on the substrate, that affect the degree of colorant mixing that occurs within the substrate, and (2) DENSITY, another user-specified parameter intended to accommodate a variety of physical characteristics such as yarn or pile lay, twist, and compaction, the shape of the yarn fiber cross section, and the index of refraction and de-lusterant content of the materials comprising the substrate whereby the substrate affects color saturation or chroma.

The WICK parameter has values 0 through 3, with loop pile carpet typically using values 0 through 1, and cut pile carpet typically using values 2 through 3. The DENSITY parameter has values 0 or greater, with about 5 as a practical upper limit. DENSITY equals 1 for the substrate chosen as the standard. Values smaller than 1 correspond to substrates less dense than the standard substrate, and result in less chromatic and lighter colors. Values greater than 1 correspond to substrates more dense than the standard substrates, and result in more chromatic and darker colors. For example, if cut pile carpet is chosen as the standard so DENSITY equals 1, then the same colors applied to loop pile requires that DENSITY be equal to about 0.3. Conversely, if loop pile carpet is chosen as the standard so DENSITY equals 1, then the same colors applied to cut pile require that DENSITY be equal to about 3. When WICK equals 0, and DENSITY equals 1, the color blend model of this invention reduces to standard Kubelka-Munk Theory.

For simplicity, assume that the computer display device is a cathode ray tube (CRT). GAMMA characterizes the relationship between CRT RGB digital counts and the resulting intensity of the displayed color (RGB phosphors). GAMMA typically ranges from 1 to 3, with 2 a typical value. When an LCD-type display is used, the procedure relating RGB values to color intensity must be appropriately modified, but the Color Blending Algorithm is unchanged. The Color Blending Algorithm relates the normalized intensity ($RGB_{VAL}$. in the flowchart) of the colored substrate to k/s values of the colorants used to predict blend color. The Algorithm itself does not depend on the type of computer display device; the inclusion of GAMMA in the flowcharts is by way of example only, and merely relates the RGB input and output of the algorithm for a CRT display device so that the colors calculated by the Algorithm may be accurately displayed.

If spectral values are used in place of RGB values to define color, then the spectral values take the place of the normalized gamma-corrected RGB values in FIG. 3B. In addition, the RGB loop in FIG. 3C becomes a loop for each spectral value and the box showing computation of $RGB_{TOTAL}$ instead computes the spectral value total, using the relationship $$r_{TOTAL}=(1+(K/S)_{TOTAL})-[(1+(K/S)_{TOTAL})^2-1]^{1/2} \text{ (Spectral Equation)}$$

where $r_{TOTAL}$ is the spectral value of the resulting color as applied to the substrate. Methods of converting spectral values to RGB values, and vice versa, will be familiar to those skilled in the art.

The Color Blending Algorithm of FIGS. 3A–3C, which had been developed for, and which was thought to be limited to, the examination of single pixels, has been found to have previously unrecognized applicability in determining color values of multi-pixel structures. This is due to the unexpected finding that colorants, even when applied to specific, individual pixel-sized areas on absorbent substrates such as textile carpets, are not immediately absorbed, but rather tend to form a mobile layer that, to a surprising degree, migrates and intermingles with colorants applied to adjoining areas of the substrate. Accordingly, the Color Blending Algorithm has been found to be applicable to the situation existing within superpixels, where intra-pixel blending is intended and encouraged. This is because the concentrations of colorants in each pixel of this type of superpixel are the same, and equal to the concentrations specified by the designer. The maximum size of superpixels meeting this criteria has already been addressed.

The automated formation of superpixels requires the use of several novel algorithms. Two of the major algorithms identified above will now be described in somewhat greater detail. Whereas the Color Blending Algorithm computes RGB values for superpixels, the other two major algorithms determine how to apportion colorant amounts into superpixel pixels.

As indicated above, the Averaging Algorithm and the Halftone Construction Algorithm are used to develop a superpixel that can be used as a repeat element in a pattern area, or used as a dithering element. It is particularly well suited in situations that call for the formation of a superpixel that will be replicated over a relatively large area to generate a uniform visual effect.

The Averaging Algorithm is identified in Blocks 50 and 45 of FIGS. 2A and 2B, respectively, and is discussed in greater detail in connection with the flow chart of FIG. 4. It specifies the number of pixels within a superpixel to receive a colorant, as well as the relative amount (i.e., the concentration) of that colorant. It does not, however, specify which of the pixels within the superpixel should receive a particular quantity of colorant. That calculation is performed by the Halftone Construction Algorithm, which will be discussed in turn. It should be noted that the Averaging Algorithm assumes that the final superpixel color is insensitive to the actual distribution of colorants within the superpixel, and that colorant blending within the superpixel is substantially uniform. This latter assumption is justified when the substrate provides for the spreading of colorant significantly beyond the point of application (e.g., the drop "footprint"), but is not necessarily valid for all substrates, and, generally speaking, is not valid for relatively un-absorbent substrates such as bond paper or conventional ink jet printer paper.

Reference to FIG. 4 is now made. To employ the Averaging Algorithm, the designer must specify the minimum colorant concentration $C_{min}$ that the patterning device can deliver (due to minimum dye jet response times, etc.) (Block 10) and the largest acceptable size (i.e., N, the maximum number of pixels comprising the superpixel) for the constructed superpixel (Block 15). The remaining necessary input is the specification by the designer of the color of the superpixel. This is specified by expressing the relative concentration of each process color component in the desired color (Block 20). The Averaging Algorithm processes these inputs in accordance with the following rules, embodied in the flow chart of FIG. 4.

For each colorant i with concentration $C_i$:

1. Let $C_{iTotal}=N \times C_i$, the total amount of colorant i that must be distributed among all of the N pixels in the superpixel (see Block 30).
2. If $C_{iTotal}<C_{min}$, then none of the blend methods discussed herein can produce the desired color, given the constraint on maximum pixel size N and minimum colorant concentration $C_{min}$ (see Block 35A). Otherwise, $C_{pixel}$ is computed as indicated in Block 45
3. If $C_{pixel}=(C_{iTotal})/N$ $C_{min}$, each of the pixels get the amount $C_i$, and the calculations for colorant i are complete.
4. If $C_{pixel}=(C_{iTotal})/(N-1)$ Cmin, then one pixel gets none of colorant i, but all of the remaining pixels (N-1) get the amount $(C_{iTotal})/(N-1)$, and the calculations for colorant i are complete. Note that the algorithm does not specify which pixel is to get no colorant.
5. If $C_{pixel}=(C_{iTotal})/(N-2)$ $C_{min}$, then two pixels get none of colorant i, but all of the remaining pixels (N-2) get the amount $(C_{iTotal})/(N-2)$, and the calculations for colorant i are complete. Note that the algorithm does not specify which two pixels are to get no colorant.
6. The process for all remaining colorants are similar to Steps 4 and 5, using amounts $(C_{iTotal})/(N-3)$, $(C_{iTotal})/(N-4)$, etc. until the test condition is met (Block 50). In the latter case, all of colorant i would be assigned to a single pixel within the superpixel (but the algorithm does not specify which pixel).

Once the Averaging Algorithm establishes the colorant concentrations to be assigned to the superpixel pixels, then the Halftone Construction Algorithm ("HCA") of FIGS. 5A and 5B provides an automated process for use in situations in which the superpixel is a 2×2 superpixel. In such situations, the established colorant concentrations can be assigned to the respective pixels within the superpixel in a way that maximizes the uniformity of color within the superpixel and minimizes the development of visually objectionable patterning artifacts such as moiré in the event the perfect commingling condition is not met, or some other condition requires it. For example, uniform application of colorant tends to prevent undyed tips of textile fibers because drops are applied over the entire surface area of the superpixel.

The details of one suitable Halftone Construction Algorithm are set forth in FIGS. 5A and 5B. The HCA version shown is optimized for use with 2×2 square superpixels (although the principles it uses may readily be extended to other pixel sizes and configurations by those skilled in the art). It uses a three stage process: (1) use of a traditional 2×2 Bayer threshold order array, (2) a rotation operation, and (3) a simple exemplary least squares metric. It should be understood that this example is for demonstration, and that prior art may be adapted to treat larger superpixels and/or different threshold order arrays, or use different rules (metrical or otherwise) for selecting a unique halftone construction from the output provided by the Averaging Algorithm.

By specifying a predetermined sequence for coloring pixels using a 2×2 Bayer Threshold Order Array in which the pixels are filled, in order, along diagonals (i.e., top left, then bottom right, then top right, then bottom left), the threshold order array insures visual uniformity when the superpixel is tiled into a pattern area by distributing each colorant throughout the superpixel. The algorithm assigns each colorant to a separate, "stackable" colorant layer array, so that the distribution of the various colorants within the superpixel may be operated on separately, then the results combined to indicate the collective effect, in keeping with the generally stratified nature of colorants in absorbent substrates. Rotation operations for each colorant layer (see FIG. 6) preserve visual uniformity when optimizing a least squares metric. The least squares metric quantifies the uniformity of liquid applied to the superpixel. The algorithm logic strives to distribute an equal total amount of liquid to each pixel in the superpixel. This logic proves to be satisfactory for practical use, even if it is not mathematically optimal.

The underlying assumption embodied in the HCA is that the superpixel size (i.e., "N") is sufficiently small that the distribution of colorants with the superpixel is the same for each pixel—to an appreciable extent, applied colorants tend to migrate throughout the superpixel, regardless of their point of application. However, it has been found that patterning artifacts (e.g., moiré, heather, or "pattern lines," formed by the undesirable placement of light or dark pixels within a repeating superpixel so as to form a visually obtrusive patterning artifact within the overall pattern) can occur if the underlying assumption is not perfectly met. The use of an order array is a precaution that further minimizes the possibility of pattern artifacts. It also disperses colorant throughout the superpixel, thereby preventing or minimizing other possible problems, such as "undyed tips" mentioned earlier.

As indicated in Block 10 of FIG. 5A, the HCA requests data available from Block 60 of the Averaging Algorithm (FIG. 4) that specifies the colorant concentrations and number of pixels in the proposed superpixel that are to contain the colorant concentrations. The HCA then generates (Block 15) an empty 2×2 colorant layer array data structure for each colorant and places a quantity of colorant ($C_{pixel}$) into the specified number of pixels (N–M) of the colorant layer array using the sequence specified by the 2×2 Bayer Threshold Order Array (Block 20). After all colorants have been treated, each resulting in a separate, saved colorant layer array (Blocks 25 and 30), the resulting colorant layer arrays are "stacked" (Block 35) providing a candidate superpixel, along with a corresponding SSD (Sum of Squared Deviations), a measure of the difference between the average amount of colorant in the superpixel and the total amount of colorant in each pixel comprising the superpixel (Block 40). The SSD for a 2×2 superpixel (N=4) may be calculated using the following formula:

$$SSD = \sum_{N=1}^{4} [C_{ave} - C_{Total\ N}]^2$$

where $C_{ave}$ equals the average colorant concentration (for all colorants) over all N pixels comprising the superpixel (i.e., the sum of all of the concentrations specified by the designer for the target color), and $C_{Total\ N}$ equals the total colorant concentration (for all colorants) within pixel N.

If the SSD equals zero, it means that the applied liquid colorant is uniformly distributed throughout the superpixel and by this criterion, the distribution of liquid over the superpixel is uniform. Generally, however, the SSD is not zero, so it is necessary to determine a minimum SSD. To assure that the SSD is minimized, each of the colorant layer arrays, in turn, is rotated 90° (FIG. 5B, Block 45), as depicted in FIG. 6, the colorant layer arrays are again stacked to construct a different candidate superpixel (Block 50), and the SSD calculation is again performed (Block 55). When all rotations of all colorant layer arrays have been performed (Blocks 45 through 80), the combination that yields the smallest SSD is deemed the best (Block 85), and is the one used to construct the superpixel. Efficient implementation of this process eliminates redundant calculations, as will be understood by those skilled in the art of computation.

Examples of the results of this process are depicted in FIG. 7 for a structural blend case and in FIG. 8 for a metapixel case. Looking first at an example involving a structural blend (see FIG. 7), the designer has decided through use of the Color Blending Algorithm that the pattern in question requires a color that is comprised of 70% Colorant 1, 15% Colorant 2, and 15% Colorant 3 (Box 10). Because the patterning system is assumed to have a minimum colorant concentration ($C_{min}$) of 30%, Colorants 2 and 3 cannot be accommodated and the color cannot be constructed through a simple in situ blending of all three colorants within a single pixel.

The designer selects 2×2 as a "default" minimum superpixel size from which to begin the process, knowing that the results of the software will clearly indicate if, in using a 2×2 superpixel size, the minimum colorant concentration limitation remains violated, and the calculations require re-initialization with a larger pixel array. Inputting these data into the Averaging Algorithm ("AA"), the AA determines colorant proportions and amounts that will yield the desired color blend, without violating the minimum colorant concentration constraint, as indicated in Box 20: Colorant 1 will occupy 4 pixels at a 70% concentration, Colorant 2 will occupy 2 pixels at a 30% concentration, and Colorant 3 will occupy 2 pixels at a 30%, concentration. These results are summarized in Box 30.

The task of specifying which of the four pixels receives these various aliquots of colorant is the responsibility of the Halftone Construction Algorithm ("HCA"). As described in Box 40, the HCA takes the data of Box 30 and constructs an initial set of colorant layer arrays with a trial arrangement of colorants ("Standard Orientations") resulting from allocations based on a 2×2 Bayer Threshold Array. However, it is determined that this will result in Colorant 2 and Colorant 3 being applied to the same pixels (the upper left and lower right), with no colorant being applied to the upper right and lower left pixels—an undesirable assignment because it clearly does not yield a uniform distribution of colorants within the superpixel, as indicated by an SSD total of 3,600. The HCA then rotates the colorant layer arrays in an attempt to construct a configuration that has a lower SSD. The configuration indicated as "Final Orientations" produces an SSD of zero, due to the fact that, using that configuration, all pixels within the superpixel contain the same total quantity of colorant. The resulting superpixel construction is indicated in Box 50. Note that, not only does each pixel show the same total colorant concentration as all other pixels, but that concentration is at an optimum level (i.e., 100%) for full saturation of the substrate.

FIG. 8 depicts a similar set of operations that involve the Formation of a metapixel. In this case, the designer has decided, through visual feedback provided by the Color Blending Algorithm, that the pattern in question requires a color that is comprised of 40% Colorant 1, 30% Colorant 2, 20% Colorant 3, and 10% Colorant 4 (Box 10). As before, the patterning system has a minimum colorant concentration ($C_{min}$) of 30% and, as before, the color will have to be constructed through the use of a superpixel. The designer again selects 2×2 as a "default" minimum superpixel size from which to begin the process. Inputting these data into the Averaging Algorithm ("AA"), the AA determines that the requisite colorant proportions and amounts that will yield the desired color blend, and that will remain within the minimum colorant concentration constraint, are as follows (Box 20): Colorant 1 will occupy 4 pixels at a 40% concentration, Colorant 2 will occupy 4 pixels at a 30% concentration, Colorant 3 will occupy 2 pixels at a 40% concentration, and Colorant 4 will occupy 1 pixel at a 40% concentration. These results are summarized in Box 30.

The task of specifying which of the four pixels receives these various aliquots of colorant is again the responsibility of the Halftone Construction Algorithm ("HCA"). As depicted in Box 40, the HCA takes the input data of Box 3 and constructs an initial set of colorant layer arrays with a trial arrangement of colorants ("Standard Orientations") resulting from allocations based on a 2×2 Bayer Threshold Array, as before. However, it is determined that this will result in Colorant 3 and Colorant 4 being applied to the same pixel (the upper left), with no colorant being applied to the upper right and lower left pixels, yielding an SSD total of 4,400. The HCA then rotates the colorant layer arrays in an attempt to construct a configuration that has a lower SSD. The configuration indicated as "Final Orientations" produces an SSD of 1,200—not ideal, but unavoidable due to the need to place a 40% concentration in only one pixel among the four.

The resulting superpixel—a metapixel—construction is indicated in Box 50. Note that in this case, each pixel does not show the same total colorant concentration as all other pixels, and three pixels are in an oversaturated condition (at 110% concentration). The fourth pixel, however, contains a colorant concentration of only 70%, resulting in an average colorant concentration within the superpixel that is at an optimum level (i.e., 100%) for full substrate saturation. In this Example, considerable colorant migration into the fourth pixel would be expected, thereby yielding a colorant concentration level within the superpixel that would not only average 100%, but that would approximate 100% in fact for each pixel.

Once the selection of process colors and all available intra-pixel blends of those process colors are computed by the Color Blending Algorithm, all these colors can be specified in terms of RGB values in the graphics arts software of choice to allow for inspection of the resulting colors on a computer monitor. Examples of software suitable for this purpose include Adobe Photoshop®, published by Adobe Systems Incorporated, San Jose, Calif., although other, readily available graphics arts software having similar capabilities can be used.

The translation process from pixel-wise specification of colors to patterning instructions for the patterning device can be achieved most straightforwardly by creating in appropriate software a look-up table that associates a given color or color combination with a set of dye applicator-specific firing instructions. Preferably, this look-up table can then be accessed by the electronic control system of the patterning device to "translate" a desired color at a given pixel location in the pattern with the proper dye delivery quantities and sequences to generate that color on the substrate at that specific pixel location. It may be necessary to store the results of the table look-up to assure that the appropriate instructions for each colorant applicator on each color bar reach the proper applicator at the proper time—when the location on the substrate to be colored by that applicator is passing under that applicator. Details of one such process of the kind described above is set forth in commonly assigned U.S. Pat. Nos. 4,984,169 and 5,195,043, hereby incorporated by reference, the relevant teachings of which are set forth below and in the accompanying drawings.

For the sake of discussion, the following assumptions, conventions, and definitions are used herein. The term "dye jet" or "jet" refers to the applicator apparatus individually associated with the formation of each dye stream in the various arrays. It will be assumed that the substrate will be printed with a pattern having a resolution or print gauge of one-tenth inch as measured along the path under the arrays, i.e., the arrays will direct (or interrupt the flow of) dye onto the substrate in accordance with instructions given each time the substrate moves one-tenth inch along its path. This implies that a pattern line, as defined earlier (i.e., a continuous line of single pattern elements extending across the substrate), has a width or thickness of one-tenth inch.

Substrate speed along the conveyor will be assumed to be one linear inch per second, or five linear feet per minute. This implies that, during each time period in which the substrate moves one-tenth inch (i.e., each one-tenth second), which hereinafter may be referred to as a pattern cycle, each and every valve controlling the individual dye jets in the various arrays will receive an electronically encoded instruction which specifies (a) whether the valve should interrupt the flow of diverting air intersecting its respective dye jet and, if so, (b) the duration of such interruption. This time, during which the stream of dye is undeflected and contacts the substrate, may be referred to as "firing time" or the time during which a dye jet "fires" or is actuated. Firing time and dye contact time are synonymous.

Array sequence numbering, i.e., first, second, etc., refers to the order in which the substrate passes under or opposite the respective arrays. Similarly, "downstream" and "upstream" refer to the conveyor direction and opposite that direction, respectively. A total of eight arrays are assumed, each having four hundred eight individual dye jets, although the invention is by no means limited to such numbers and may easily adapted to support thousands of individual dye jets per array, and/or a greater number of individual arrays. Array-to-array spacing along the direction of substrate travel is assumed to be uniformly ten inches, i.e., one hundred pattern line widths. Note that one hundred pattern lines implies the processing of pattern data for one hundred pattern cycles.

For purposes of discussion, the electronic control system will be described in conjunction with the metered jet patterning apparatus discussed below and depicted in the Figures, to which this control system is particularly well suited. It should be understood, however, that this electronic control system may be used, perhaps with obvious modifications, in other devices where similar quantities of digitized data are rapidly distributed to a large number of individual elements.

FIG. 1 shows a jet dyeing apparatus 18 comprised of a set of eight individual color bars 36 positioned within frame 32. Each color bar 36 is comprised of a plurality of dye jets, perhaps several hundred in number, arranged in spaced alignment along the length of the color bar, which color bar extends across the width of substrate 15. Substrate 15, such as a textile fabric, is supplied from roll 34 as transported through frame 32 and thereby under each color bar 36 by conveyor 40 driven by a motor indicated generally at 38. After being transported under color bars 36, substrate 15 may be passed through other dyeing-related colors steps such as drying, fixing, etc.

Referring to FIG. 9, there is shown in schematic form a side elevation of one color bar 36 comprising the jet dyeing apparatus 18 of FIG. 1. For each such color bar 36, a separate dye reservoir tank 33 supplies liquid dye under pressure by means of pump 35 and dye supply conduit means 37, to a primary dye manifold assembly 39 or the color bar 36. Primary manifold assembly 39 communicates with and supplies dye to dye sub-manifold assembly 41 at suitable locations along their respective lengths. Both manifold assembly 39 and sub-manifold assembly 41 extend across the width of conveyor 40 on which the substrate to be dyed is transported. Sub-manifold assembly 41 is provided with a plurality of spaced, generally downwardly directed dye passage outlets positioned across the width of conveyor 40 which produce a plurality of parallel dye streams which are directed onto the substrate surface to be patterned.

Positioned in alignment with an approximately perpendicular to each dye passage outlet (not shown) in sub-manifold assembly 41 is the outlet of an air deflection tube 62. Each tube 62 communicates by way of an air deflection conduit 64 with an individual electro-pneumatic valve, illustrated collectively at "V," which valve selectively interrupts the flow of air to air tube 62 in accordance with the pattern information supplied by pattern control system 16. Each valve is, in turn, connected by an air supply conduit to a pressurized air supply manifold 74 which is provided with pressurized air by air compressor 76. Each of the valves V., which may be, for example, of the electromagnetic solenoid type, are individually controlled by electrical signals received over bus 26 from the electronic pattern control system 16. The outlets of deflection tubes 62 direct streams of air which are aligned with and impinge against the downwardly directed dye passages within sub-manifold 41 and deflect such streams into a primary collection chamber or trough 80, form which liquid dye is removed, by means of a suitable dye collection conduit 82, to dye reservoir tank 33 for re-circulation.

Figure 20:
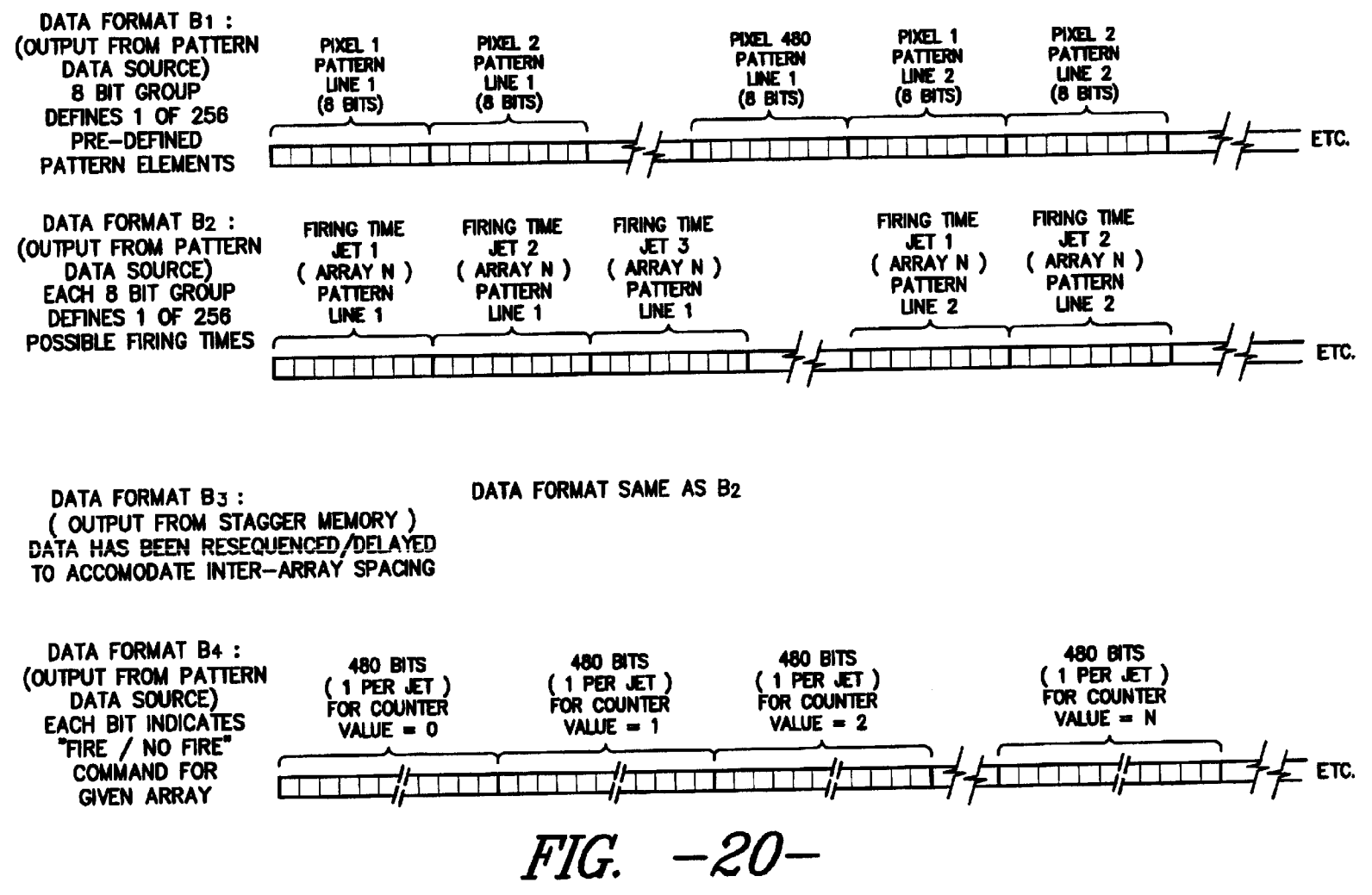

The pattern control system 16 receives pattern data over bus 22 from the multiprocessor system described in FIG. 12. Desired pattern information from control system 16 is transmitted to the solenoid valves of each color bar 36 at appropriate times in response to movement of the substrate under the color bars by conveyor 40, which movement is detected by suitable rotary motion sensor or transducer means 19 operatively associated with the conveyor 40 and connected to control system 16. The pattern control system 16 will be discussed in detail herein below, in conjunction with reference to FIGS. 17 through 21.

For purposes of comparison, another control system of the prior art is disclosed in FIG. 10 and will be described in detail below. For purposes of explanation, the format of the patterning data or patterning instructions for this prior art control system, as indicated in FIG. 10, is schematically depicted in FIG. 11. As shown, the pattern element data (in Data Format A1) is first converted to "on/off" firing instructions (referring to the de-actuation or actuation, respectively, of the diverting air associated with the individual dye streams) by electronically associating the "raw" pattern data with pre-generated firing instruction data from a computer generated look-up table ("LUT"). This firing instruction data merely specifies, using a single logical bit for each jet, which jets in a given array shall fire during a given pattern cycle, and is represented by Data Format A2 of FIG. 11.

In generating such look-up tables, the raw pattern data must first be converted to "on/off" firing instructions. The control system accepts the raw source pattern data in the form of a series of pixel codes. The pixel codes define those distinct areas of the pattern which may be assigned a distinguishing color. Each code specifies, for each pattern line, the dye jet response for a given dye jet position on each and every array. In a system having eight color bars, for example, each pixel code therefore controls the response of eight separate dye jets (one per color bar) with respect to a single pattern line. The term "pattern line," as used herein, is intended to describe a continuous line of single pattern elements extending across the substrate parallel to the patterning color bars. Such pattern lines have a thickness, measured in the direction of substrate travel, equal to the maximum permitted amount of substrate travel under the patterning color bars between color bar pattern data updates. The term "patterning element," as used herein, is intended to be interchangeable with the term "pixel" as that term is used herein with respect to the generation of the pattern.

An operator's interface, such as a workstation terminal, may be coupled to the host computer in the multiprocessor system. The workstation serves as the operator's interface for providing the input parameters to the host computer for each job of patterns to be generated on the substrate of the textile dyeing apparatus.

The operator enters the input parameters as a "RUN LIST" which designates the type of substrate to be dyed and the types of patterns to be printed for each job. The RUN LIST input, for the type of base to be dyed, accesses a base file which includes the firing time for each of the color bars in the dyeing apparatus. The RUN LIST entry, for the type of pattern, accesses a stock keeping unit (SKU) file. The SKU file designates for each pixel code used in the pattern, the respective color bar associated therewith. With this information, the multiprocessor and control systems generate the individual firing instructions for each jet in each color bar.

The system described below produces the look-up tables from the operator's RUN LIST in a four-phase operation.

First, the type of RUN LIST entry is determined and an appropriate table generated to store its information. If an entry is a Base entry, then a firing time table is generated for the particular substrate associated with the Base entry. If the entry is determined to be a Color entry, the second phase of operation generates a machine color table for the color loading configuration. If the entry is an SKU entry, then the third phase generates a pattern color table including the information from the respective SKU file identified by the SKU entry. The pattern color table associates each pixel code with a particular color name rather than a fixed color bar in the jet dying apparatus a previously was done. Thus, for example the pixel code A is associated with a color name such as "red" rather than a particular color bar.

The fourth phase of operation generates the look-up tables from the data provided in the firing time table, machine color table and pattern color table. In this system, the operator only needs to input the color entries for the machine color loading configuration to correctly generate the proper look-up tables for the requested pattern and substrate.

It is an advantage to reduce the amount of storage space necessary by eliminating the need for storing converted firing instructions. Further, a series of jobs can be continuously printed without requiring machine "down" time previously necessary to clean and reload a particular color bar. The operator may randomly load the colors into the machine's color bars irrespective of the patterns to be run. The system software automatically generates the correct look-up tables for the particular machine configuration.

Referring to FIG. 12, the multiprocessor patterning system 5 is shown having a host computer 12 coupled via a bus 11 to a real-time computer 10. Optional pattern computer 14 is further coupled to the host computer 12 and real-time computer 10 by the bus 11. It is readily apparent that the coupling of the pattern computer 14, host computer 12 and real-time computer 10 may be by any means for coupling a local area network (LAN) such as an Ethernet bus. A pattern control system 16 is coupled via bus 26 to a jet dyeing apparatus 18. The pattern control system 16 received input data over bus 22 from the real-time computer 10. Optional pattern computer 14 may be provided to allow a user of the system to quickly create their own pattern design. Alternatively, pattern designs may be pre-loaded onto magnetic or optical media for reading into the system.

Each design has an associated stock keeping unit (SKU) file for providing the set-up parameters for the system for each pattern. An SKU file includes the pattern name for the pattern to be printed, the associated color names for each pixel code in the pattern, and a base reference ID identifying the substrate on which the pattern is to be printed.

The base reference ID accesses a base file containing the firing times for each color bar in the jet dyeing apparatus 18 for that particular substrate. A simplified example of an SKU file for several patterns and a Base file are given below in Tables A and B.

TABLE A

SKU FILE

| SKU | ABC |
|---|---|
| Pixel Code A = | Red |
| Pixel Code B = | Blue |
| Base Reference = | WXYZ |
| SKU | ADE |
| Pixel Code A = | 50% Red |
| | 50% Blue |
| Pixel Code C = | Green |
| SKU | CDF |
| Pixel Code A = | Green |
| Pixel Code B = | Blue |
| Pixel Code C = | 25% Yellow |
| | 50% Red |
| | 25% Blue |

TABLE B

BASE FILE

| BASE | WXYZ |
|---|---|
| Color Bar 1 = | 10 ms |
| Color Bar 2 = | 10 ms |
| Color Bar 3 = | 20 ms |
| Color Bar 4 = | 15 ms |

Referring back to FIG. 12, a computer terminal 13 may be coupled via a suitable connection 17, e.g., a standard RS232 cable, to the host computer 12. The terminal 13 then serves as the operator's interface for providing input parameters in the form of a RUN LIST to the host computer 12 for each job or series of jobs to be generated on the substrate by jet dyeing apparatus 18. The RUN LIST is simply a series of instructions provided to the host computer 12 for retrieving the SKU file and base file for printing a requested pattern. The RUN LIST further includes the machine set-up or "color loading" for each of the color bars in the jet dyeing apparatus 18. An example of a typical RUN LIST is given below in Table C wherein the SKU files are identified by a three-character code and the Base file is identified by a four-character code.

TABLE C

OPERATOR'S RUN LIST

| Base = | WXYZ |
|---|---|
| Color Bar 1 = | Red |
| Color Bar 2 = | Blue |
| Color Bar 3 = | Green |
| Color Bar 4 = | Yellow |
| SKU | ABC |
| SKU | ADE |
| SKU | CDF |

The host computer 12 fetches the pattern data from the pattern computer 14 or other storage source (not shown) and sets it up for processing by the real-time computer 10. The real-time computer 10 functions to ensure that the raw source pattern data is properly output to the pattern control system 16 and hence provided to the individual jets in the jet dyeing apparatus 18.

FIG. 13 shows a flow chart illustrating the software operation for automatically generating the look-up tables associated with each color bar for each requested pattern. The system makes use of the RUN LIST generated by the operator at terminal 13 (FIG. 12) for producing the look-up tables for the requested pattern in the requested color combination. As discussed above, the system operates in four phases, the first three phases retrieve the file information and the machine color loading configuration necessary to produce the look-up tables for the requested pattern and the fourth phase actually generates the look-up tables to be used.

The machine operator need only input in his RUN LIST (1) which color bars contain which color, i.e., the color bar machine configuration loading, (2) what carpet base is being run, e.g., Base WXYZ, Base HIJK, etc. and (3) the requested pattern, e.g., SKU=ABC, ADE, CDF, etc. As shown in FIG. 13, the software system starts (at 42) by obtaining a RUN LIST entry 44 from the operator's RUN LIST. Next, the system determines the type of RUN LIST entry, i.e., Base entry, color entry, or SKU entry as indicated by steps 46, 52 and 58. If the RUN LIST entry is a Base entry, then the system retrieves the Base file for that entry and obtains the firing times for each color bar for the respective substrate base as shown in step 48. From the firing times, the system generates a firing time table for each color bar in the jet dyeing apparatus at step 50. Once the firing time table has been generated, the system loops back to retrieve the next RUN LIST entry.

If the RUN LIST entry is a color entry, then the system obtains the color loading indicated by the RUN LIST (step 45). The machine configuration color loading is determined by the operator depending upon which colors are loaded into the respective dye tanks 33 (FIG. 9) for each color bar 36 in the jet dyeing apparatus 18 (FIG. 1). From the color loading, a table of machine colors for the color bars is generated, as indicated by step 56, and the system then loops to obtain the next RUN LIST entry.

If the RUN LIST entry is an SKU entry, then the system obtains the data from the SKU file, stored elsewhere in the system, such as in the pattern computer 14 (FIG. 12) or optical disk storage (not shown). From the SKU file, a pattern color table is generated, step 61, containing the colors associated with each pixel code in the pattern. Once the firing time table, machine color table, and pattern color table have been generated for a respective job, then the final phase of actually generating the look-up table ("LUT") is performed as shown in the flow chart of FIG. 14.

The system automatically generates the look-up tables for each color bar for the respective pattern, step 66, by first obtaining a first pixel code from the pattern color table, as indicated at step 68. Next, at step 70, using the pixel code previously obtained, the first color and percent of color from the pattern color table are obtained. Using the color, the system next gets the color bar number associated with that color from the machine color table, step 72. From the color bar number, the system obtains the firing time for the respective color bar from the firing time table as indicated by step 78. At step 84, a modified firing time is obtained by multiplying the percent of color, obtained in step 70, and the firing time obtained in step 87. The modified firing time is then stored in the look-up table for the given pixel code and color bar number as indicated by step 86.

The system then determines whether all colors for the particular pixel code have been found, step 88. If not, the system loops back to step 70 wherein the next color and percent of color are obtained from the pattern color table for the particular pixel code. This loop, steps 70–88, continues to repeat until all of the colors for the particular pixel code have been found.

At this point, the system determines whether all pixel codes have been loaded into the look-up table. If not, the system reverts to step 68 wherein the next pixel code is obtained from the pattern color table. The steps 68–90 then continue to loop until all pixel codes have been loaded into the look-up table. At this point, the entire look-up table for the requested pattern has been generated and is sent to the jet dyeing apparatus (step 92) before completing (step 94).

The system software depicted by the flow charts shown in FIGS. 13 and 14 repeats itself each time new look-up tables are required. This may occur due to a change in the pattern to be printed, a change in the substrate or base upon which the pattern is to be printed or when the machine is configured differently. In this respect, it may be necessary to reconfigure the machine due to a malfunction of one or more of the color bars. For example, if the apparatus includes eight color bars, and only two colors are necessary for the pattern, if one of the color bars malfunctions, then that color can be loaded into one of the remaining six color bars and new lock-up tables can be generated to print the desired pattern.

A simplified series of examples are described below to illustrate the operation of the present invention. For purposes of illustration in these examples, a jet dyeing apparatus 18 is assumed to contain only four color bars. Further, the SKU files and Base files are as given above in Tables A and B. The exemplary operator's RUN LIST, given in Table C above, will be used to process the jobs for SKU files ABC, ADE and CDF.

In operation, the first RUN LIST entry "Base=WXYZ" is obtained (step 44). The system determines that the entry is a Base entry and obtains the firing times for Base WXYZ from the Base file (step 48). The system then generates the firing time table for each color bar as shown in FIG. 15A wherein the firing times are given in milliseconds (ms).

The next RUN LIST entry, "Color Bar 1=red," is obtained and it is determined that it is for a color entry (step 52). The system obtains the color loading from the RUN LIST and generates the table of machine colors for the color bars as shown in FIG. 15B. Each of the color entries in the RUN LIST is obtained to complete the machine color table.

The system then obtains the next RUN LIST entry, "SKU=ABC," and obtains the corresponding data from the respective SKU file (step 60). From the SKU data, the pattern color table shown in FIG. 15C is obtained.

At this point, the system begins generating the actual look-up table for the requested pattern identified by SKU ABC. The first pixel code A and its associated color, red, are obtained from the pattern color table. Next, the system identifies the color red with color bar 1 from the machine color table. Finally, the firing time for color bar 1 is obtained from the firing time table. Thus, in our example, a firing time of 10 ms, associated with color bar 1, is stored in the look-up table shown in FIG. 15D for the respective pixel code A.

The system then repeats itself for pixel code B resulting in the storage of a 10 ms firing time for color bar 2 in the look-up table. Any look-up entry not filled by the system is assumed to contain a zero firing time or "null" firing time. Thus, the system generates the look-up tables shown in FIG. 15D for the requested pattern ABC.

Continuing the example, the next RUN LIST entry: SKU=ADE: is obtained from the operator's RUN LIST. This indicates a new pattern is requested and, in all likelihood, new look-up tables would need to be generated. Tables 16A–16C indicated the firing time table, machine color table and pattern color table, respectively, associated with SKU ADE.

For this example, the firing time table shown in FIG. 16A is identical to the previous example as the same Base WXYZ is being run through the apparatus. Similarly, the machine color table remains the same as none of the color bar color loadings have been changed. The pattern color table, however, differs from the preceding example because a new pattern, SKU ADE is being run. As shown in FIG. 16C and the SKU file associated with the pattern ADE, for pixel code A, the associated colors include 50% red and 50% blue—signifying an in situ blend of these two colors. Thus, when generating the look-up table entries, steps 70–88 of FIG. 14 would loop twice, i.e., once for 50% red and a second time for the next color, 50% blue.

In this example, the look-up tables shown in FIG. 16D are generated by the system. Pixel code a is first obtained from the pattern color table and its first color and percent of color, 50% red, are obtained (step 70). Next, the system associates the color red with color bar number 1 and then obtains the firing time of 10 milliseconds for that color bar from the firing time table. This firing time, 10 milliseconds, is multiplied by the percent of the color to obtain the modified firing time. Thus, 10 milliseconds times 50% equals 5 milliseconds which is then stored in the look-Lip table for the given pixel code and color bar.

Because all colors for this pixel code have not yet been found, the system loops back to step 70 (FIG. 14) and obtains the next color, i.e., 50% blue. This sequence of steps, 70–88, are repeated and the modified firing time stored in the look-up table (FIG. 16D). The operation then repeats for the remaining pixel codes in the pattern color table until the look-up tables are completed. It is apparent that by using percentages of colors, the colors can be shaded or blended within a given pixel to form other colors which are not loaded in the jet dying apparatus.

Returning to the operator's RUN LIST, the next entry "SKU=CDF" is obtained and the look-up tables of FIG. 16E are generated in accordance with the examples set forth above.

As shown above, the system automatically generates the look-up tables in response to the operator's RUN LIST. The operator only needs to input the type of base to be run, the SKU pattern requested, and the machine configuration. The system then generates the look-up tables without any costly time delays for reloading colors in the color bars. Further, if one of the color bars malfunctions, the operator can still possibly finish the RUN LIST without any delays. For example, assume a five color bar machine wherein only four of the color bars have been previously loaded as in the above examples. If, while preparing to run the pattern given by SKU ABC, the machine malfunctions and color bar 1 is no longer operative, then the operator can quickly load color bar 5 with the red color dye and the system will automatically generate new look-up tables in response thereto. (It is assumed the Base ID specifies a 10 ms firing time for color bar 5.) In this example, the look-up tables shown in FIG. 16F would be generated as opposed to the look-up tables shown in FIG. 15D for a non-malfunctioning system. In either event, the correct pattern having the correct colors would be printed.

Following the generation of the appropriate look-up tables, the individual "on/off" firing instructions must be directed to the appropriate dye jets in a way that accommodates the physical arrangement of the arrays on the machine. The proper firing instruction data corresponding to a given area of the substrate to be patterned must arrive at the initial array and at each downstream array at the exact time at which that given substrate area passes under the proper array. This is accomplished by interleaving the array data and inserting synthetic "off" data for downstream arrays at pattern start and for upstream arrays at pattern end, to effectively sequence and delay the arrival of pattern data to the downstream arrays until the substrate has had the opportunity to move into position under the downstream arrays. The data exiting this interleaving operation is in the form of a serial bit stream comprising, for a given pattern cycle, one bit per jet (indicating whether the jet should fire during this cycle) for each respective jet in each array, as indicated in Data Format A3 of FIG. 11.

This serial bit stream is then fed to a data distributor which, for each "start pattern cycle" pulse received from the registration control system (indicating a new pattern line is to begin), simply counts the proper number of bits corresponding to the number of jets in a given array, in the sequence such bits are received from the interleaving operation. When the proper number of bits necessary to comprise firing instructions for that entire array has been counted, that set of bits is sent, in serial form, to the proper array for further processing, as described below, and the counting procedure is begun again for the next array involved in the patterning operation. Each array, in a rotating sequence, is sent data in similar fashion for a given pattern line, and the process is repeated at each "start patterning cycle" pulse until the patterning of the substrate is completed.

Associated with each array is an electronically encoded value for the actual firing time to be used by that array for all patterning cycles associated with a given pattern. It is important to note that this "duration" value may vary from array to array and can vary from jet to jet or from patterning cycle to patterning cycle. This "duration" value is superimposed upon the "fire/don't fire" single-bit data received from the pattern data distribution operation and is temporarily stored in one or more shift registers individually associated with each array. After a predetermined delay to allow time for the shift registers to fill, the data is sent simultaneously to the respective valves associated with the diverting streams of air at each dye jet position along the array.

The control system depicted in FIGS. 17 through 20 may be most easily described by considering the system as essentially comprising three separate data storage and allocation systems (a firing time converter, which incorporates a memory, a "stagger" memory and a "gatling" memory) operating in a serial sequence. These systems are schematically depicted in FIG. 17, which represents an overview of the control system of the present invention as applied to a patterning device disclosed above. FIG. 20 schematically depicts representative data formats at the process stages indicated in FIG. 17. Each array is associated with a respective firing time converter and "stagger" memory, followed by a separate "gatling" memory, arranged in tandem. Each of these major elements will be discussed in turn.

The raw pattern data is sent as prompted by the "start pattern cycle" pulse received from the substrate motion sensor (FIG. 17). This sensor merely generates a pulse each time the substrate conveyor moves the substrate a predetermined linear distance (e.g., one-tenth inch) along the path under the patterning arrays. (Note that, in the system of the prior art, the "start pattern cycle" pulse was received form the registration control system; in the novel system described herein, a separate registration control system is not needed.) The same "start pattern cycle" pulse is simultaneously sent to each array, for reasons which will be explained below.

The raw patterning data is in the form of a sequence of pixel codes, with one such code specifying, for each pattern line, the dye jet response for a given dye jet position on each and every array, i.e., each pixel code controls the response of eight separate dye jets (one per array) with respect to a single pattern line. As discussed above, the pixel codes merely define those distinct areas of the pattern which may be assigned a different color. The data is preferably arranged in strict sequence, with data for applicators 1–480 (assuming 480 applicators per color bar) for the first pattern line being first in the series, followed by data for applicators 1–480 for the second pattern line, etc., as depicted by Data Format B1 of FIG. 20.

The complete serial stream of such pixel codes is sent, in identical form and without any array-specific allocation, to a firing time converter/memory associated with each respective array for conversion of the pixel codes into firing times. This stream of pixel codes preferably comprises a sufficient number of codes to provide an individual code for each dye jet position across the substrate for each pattern line in the overall pattern. Assuming eight arrays of 480 applicators each, a pattern line of 0.1 inch in width (measured along the substrate path), and an overall pattern which is 60 inches in length (i.e., measured along the substrate path), this would require a raw pattern data stream comprised of 288,000 separate codes.

Comprising each firing time converter is a look-up table having a sufficient number of addresses so that each possible address code forming the serial stream of pattern data may be assigned a unique address in the look-up table. At each address within the look-up table is a byte representing a relative firing time or dye contact time, which, assuming an eight bit address code is used to form the raw pattern data, can be zero or one of 255 different discrete time values corresponding to the relative amount of time the dye jet in question is to remain "on." (More accurately, in the patterning apparatus disclosed, these time values represent the relative amount of time the valve associated with the respective diverting air jet shall remain closed, thereby interrupting the diverting air stream and allowing the stream of dye to strike the substrate.) Accordingly, for each eight-bit byte of pixel data, one of 256 different firing times (including a firing time of zero) is defined for each specific jet location on each and every array.

Jet identity is determined by the relative position of the address code within the serial stream of pattern data and by the information pre-loaded into the look-up table, which information specifies in which arrays a given jet position fires, and for what length of time. (If desirable, data individually comprised of two or more bytes, specifying, e.g., one of 65,536 different firing times or other patterning parameter levels may be used in accordance with the teachings herein, with appropriate modifications to the hardware.) The result is sent, in Data Format B2 (see FIG. 20), to the "stagger" memory associated with the given array. AT this point, no attempt has been made to compensate for the physical spacing between arrays or to group and hold the date for sending to the actual air valves associated with each dye jet.

Compensation for the physical spacing between arrays may be best explained with reference to FIGS. 18A and 1 8B, which functionally describe the individual stagger memories for various arrays in greater detail.

The "stagger" memory operates on the firing time data produced by the look-up tables and performs two principal functions: (1) the serial data stream from the look-up table, representing firing times, is grouped and allocated to the appropriate arrays on the patterning machine and (2) "non-operative" data is added to the respective pattern data for each array to inhibit, at start-up and for a pre-determined interval which is specific to that particular array, the reading of the pattern data in order to compensate for the elapsed time during which the specific portion of the substrate to be patterned with that pattern data is moving from array to array.

The "stagger" memory operates as follows. The firing time data is sent to an individual random access memory (RAM) associated with each of the eight arrays. Although either static or dynamic RAMs may be used, static RAMs have been found to be preferred because of increased speed. At each array, the data is written to the RAM in the order in which it was sent from the look-up table, thereby preserving the jet and array identity of the individual firing times. Each RAM preferably has sufficient capacity to hold firing time information for the total number of pattern lines extending from the first to the eighth array (assumed to be seven hundred for purposes of discussion) for each jet in its respective array. In the discussion which follows, it may be helpful to consider the seven hundred pattern lines as being arranged in seven groups of one hundred pattern lines each (to correspond with the assumed inter-array spacing).

The RAMs are both written to and read from in a unidirectional repeating cycle, with all "read" pointer being collectively initialized and "lock-stepped" so that corresponding address locations in all RAMs for all arrays are read simultaneously. Associated with each RAM is a pre-determined offset value which represents the number of sequential memory address values separating the "write" pointer used to insert the data into the memory addresses and the "read" pointer used to read the data from the RAM addresses, thereby "staggering" in time the respective read and write operations for a given memory address.

As depicted on the left hand side of FIG. 18A, the RAM offset value for the first array is zero, i.e., the "read pattern data" operation is initiated at the same memory address as the "write pattern data" operation, with no offset. The offset for the second array, however, is shown as being one hundred, which number is equal to the number of pattern lines or pattern cycles (as well as the corresponding number of read or write cycles) needed to span the distance physically separating the first array from the second array, as measured along the path of the substrate in units of pattern lines.

As depicted, the "read pattern" pointer, initialized at the first memory address location, is found one hundred address locations "above" or "earlier" than the "write" pointer. Accordingly, beginning the "read" operation at a memory address location which lags the "write" operation by one hundred consecutive locations effectively delays the reading of the written data by one hundred pattern cycles to correspond to—and compensate for—the physical spacing between the firs and second array. To avoid using "dummy" data for the "read" operation until the "read" pointer catches up with the first address written to by the "write" pointer, a "read inhibit" procedure may be used. Such procedure would only be necessary at the beginning and end of a pattern. Alternatively, data representing zero firing time can be loaded into the RAMs in the appropriate address locations so that the "read" operation, although enabled, reads data which disables the jets during such times.

The right hand side of FIGS. 18A and 18B depicts the stagger memory for the eighth array. As with all other arrays, the "read" pointer has been initialized to the first memory address in the RAM. The "write" pointer, shown at its initialized memory address location, leads the "read" pointer by an address difference equivalent to seven hundred pattern lines (assuming seven intervening arrays and a uniform inter-array spacing of one hundred pattern lines).

FIG. 18B depicts the stagger memories of FIG. 18A exactly one hundred pattern cycles later, i.e., after the data for one hundred pattern lines have been read. The "read" and "write" pointer associated with Array 1 are still together, but have moved "down" one hundred memory address locations and are now reading and writing the firing time data associated with the first line of the second group of one hundred pattern lines in the RAM.

The "read" and "write" pointers associated with Array 2 are still separated by an offset corresponding to the physical spacing between Array 1 and Array 2, as measured in units of pattern lines. Looking at the pointers associated with Array 8, the "read" pointer is positioned to read the first line of firing time data from the second group of one hundred pattern lines, while the "write" pointer is positioned to write new firing time data into RAM addresses which will be read only after the existing seven hundred pattern lines in the RAM are read. It is therefore apparent the "read" pointer is specifying firing time data which was written seven hundred pattern cycles previously.

The storage registers associated with each array's stagger memory store the firing time data for the pattern line to be dyed by that respective array in that pattern cycle until prompted by a pulse from the substrate transducer indicating the substrate has traveled a distance equal to the width of one pattern line. At that time, the firing time data, in Data Format B3 (see FIG. 20), is sent to the "gatling" memory for processing as indicated below, and firing time data for the next pattern line is forwarded to the stagger memory for processing as described above.

FIG. 19 depicts a "gatling" memory module for one array. For the patterning device depicted in FIG. 1, eight configurations of the type shown in FIG. 19 would be necessary, one for each array. In a preferred embodiment, all would be driven by a common clock and counter. The gatling memory performs two principal functions: (1) the serial stream of encoded firing times is converted to individual strings of logical (i.e., "on" or "off") firing commands, the length of each respective "on" string reflecting the value of the corresponding encoded firing time, and (2) these commands are quickly and efficiently allocated to the appropriate applicators.

As depicted in FIG. 19, associated with each array is a set of dedicated first in-first out memory modules (each of which will be hereinafter referred to as a "FIFO"). An essential characteristic of the FIFO is that data is read out of the FIFO in precisely the same order or sequence in which the data was written into the FIFO. In the exemplary embodiment described herein, the set of FIFO modules must have a collective capacity sufficient to store one byte (i.e., eight bits, equal to the size of the address codes comprising the original pattern data) of data for each of the four hundred eighty diverting air valves in the array. For purposes of explanation, it will be assumed that each of the two FIFOs shown can accommodate two hundred forty bytes of data.

Each FIFO has its input connected to the sequential loader and its output connected to an individual comparator. A counter is configured to send an eight bit incrementing count to each of the comparators in response to a pulse from a "gatling" clock. The "gatling" clock is also connected to each FIFO, and can thus synchronize the initiation of operations involving both the FIFOs and the respective comparators associated with each FIFO. If the smallest increment of time on which "firing time" is based is to be different from array to array, independent clocks and counters may be associated with each such array. Preferably, the output from each comparator may be operably connected to a respective shift register/latch combination, which serves to store temporarily the comparator output data before it is sent to the respective array, as described in more detail below. Each comparator output is also directed to a common detector, the function of which shall be discussed below. As indicated in FIG. 19, a reset pulse from the detector is sent to both the "gatling" clock and the counter at the conclusion of each pattern cycle, as will be explained below.

In response to the transducer pulse, the respective stagger memories for each array are read in sequence and the data is fed to an array-specific sequential loader, as depicted in FIG. 19. The sequential loader sends the first group of two hundred forty bytes of data received to a first FIFO and the second group of two hundred forty byes of data to a second FIFO. Similar operations are performed simultaneously at other sequential loaders associated with other arrays. Each byte represents a relative firing time or dye contact time (or, more accurately, an elapsed diverting air stream interruption time) for an individual jet in the array.

After each of the FIFOs for each array are loaded, they are simultaneously sent a series of pulses from the "gatling" clock, each pulse prompting each FIFO to send a byte of data (comprised in eight bits), in the same sequence in which the bytes were sent to the FIFO by the sequential loader, to its respective individual comparator. This FIFO "firing time" data byte is one of two separate inputs received by the comparator, the second input being a byte sent from a single counter common to all FIFOs associated with every array. This common counter byte is sent in response to the same gatling clock pulse which prompted the FIFO data, and serves as a clock for measuring elapsed time from the onset of the dye stream striking the substrate for this pattern cycle. At each pulse from the gatling clock, a new byte of data is released from each FIFO and sent to its respective comparator.

At each comparator, the eight bit "elapsed time" counter value is compared with the value of the eight bit "firing time" byte sent by the FIFO. The result of this comparison is a single "fire/no fire command" bit sent to the shift register, as well as the director. If the FIFO value is greater than the counter value, indicating the desired firing time as specified by the pattern data is greater than the elapsed firing time as specified by the counter, the comparator output bit is a logical "one" (interpreted by the array applicators as a "fire" command). Otherwise, the comparator output bit is a logical "zero" (interpreted by the array applicators as a "no fire" or "cease fire" command). At the next gatling clock pulse, the next byte of firing time data in each FIFO (corresponding to the next individual jet along the array) is sent to the respective comparator, where it is compared with the same counter value. Each comparator compares the value of the firing time data forwarded by its respective FIFO to the value of the counter and generates a "fire/no fire" command in the form of a logical one or logical zero, as appropriate, for transmission to the shift register and the detector.

This process is repeated until all two hundred forty "firing time" bytes have been read from the FIFOs and have been compared with the "elapsed firing time" value indicated by the counter. At this time the shift register, which now contains a serial string of two hundred forty logical ones and zeros corresponding to individual firing commands, forwards these firing commands in parallel format to a latch. The latch serves to transfer, in parallel, the firing commands from the shift register to the individual air valves associated with the array dye applicators at the same time the shift register accepts a fresh set of two hundred forty firing commands for subsequent forwarding to the latch. Each time the shift register forwards its contents to the latch (in response to a clock pulse), the counter value is incremented.

Following this transfer, the counter value is incremented by one time unit and the process is repeated, with all two hundred forty bytes of "firing time" data in each FIFO being reexamined and transformed into two hundred forty single bit "fire/no fire" commands, in sequence, by the comparator using the newly incremented value of "elapsed time" supplied by the counter. While, in a preferred embodiment, the serial firing commands may be converted to, and stored in, a parallel format by the shift register/latch combination disclosed herein, it is foreseen that various alternative techniques for directing the serial stream of firing commands to the appropriate applicators may be employed, perhaps without converting said commands to a true parallel format.

The above process, involving the sequential comparison of each FIFO's entire capacity of firing time data with each incremented "elapsed time" value generated by the counter, is repeated until the detector determines that all comparator outputs for that array are a logical "zero." This indicates that, for all jets in the array, no desired firing time (represented by the FIFO values) for any jet in the array exceeds the elapsed time indicated by the counter. When this condition is sensed by the comparator, it indicates that, for that pattern line and that array, all required patterning has occurred. Accordingly, the detector sends "reset" pulses to both the counter and to the gatling clock. The gatling module then waits for the next substrate transducer pulse to prompt the transmission and loading of firing time data for the next pattern line by the sequential loader into the FIFOs, and the reiterative reading/comparing process is repeated as described above.

In a preferred embodiment, the gatling memory for each array may actually consist of two separate and identical FIFOs which may alternately be connected to the array valves. In this way, while data are being read out and compared in one gatling memory, the data for the next pattern line may be loaded into the FIFOs associated with the alternate gatling memory, thereby eliminating any data loading delays which might otherwise be present if only one gatling memory per array were used. It should be apparent that the number of individual FIFOs may be appropriately modified to accommodate a grater or lesser number of dye jets in an array.

FIG. 21 depicts an optional memory, to be associated with each array, which may be used when maximum pattern definition is desired. This memory, which may take the form of a static RAM, functions in a "tuning" or "trimming" capacity to compensate, in precise fashion, for small variations in the response time or dye flow characteristics of the individual applicators. This is achieved by means of a look-up table embodied in the RAM which associates, for each applicator in a given array, and, if desired, for each possible firing time associated with each such applicator, an individual factor which increases or decreases the firing time dictated by the pattern data by an amount necessary to cause all applicators in a given array to deliver substantially the same quantity of dye onto the substrate in response to the same pattern data firing instructions.

By providing an automated means by which superpixels providing a pre-specified color may be constructed and tiled in pattern areas or used as dithering elements, the use of the Averaging Algorithm and Halftone Construction Algorithm greatly expands the range of palette colors that are available to color a given pattern, and also greatly enhances the ability of dithering algorithms to generate perceived colors that closely match continuous toned images. This additional versatility can make the initial choice of process colors less important to the overall ability of the system to reproduce a desired target color, and thereby can provide for the generation of a wide range of perceived colors on substrates with the use of a relatively small number of different process colors.

The preferred embodiments described above are intended to be by way of example only. It is anticipated that modifications to the above that fall within the scope of the present invention will be apparent from the above description. The present invention is to be limited not by that description, but rather by the scope of the following claims.

We claim:

1. An automated process for coloring a superplxel, defined within a computer aided design system, containing a specified number of constituent pixels N and using a pre-defined set of process colors, for use in coloring a pattern area on an absorbent substrate having a specified target color, said process comprising the steps of:
   a. determining the color component values of said set of process colors and the color component values of said target color, wherein said color component values of said process colors, as defined, include an accommodation for the reflectivity of said substrate;
   b. defining a combination of said process colors, each of said process colors having an individually specified concentration to be assigned to said superpixel that, when blended together, will produce said target color, wherein said assignment of process colors to specific constituent pixels is constrained by a minimum specified concentration; and
   c. determining, within said combination of said process colors of Step (b), an assignment of specific concentrations of said process colors to specific constituent pixels that produces a desired distribution of colorants within said superpixel.

2. The process of claim 1 wherein said accommodation involves the use of the Kubelka-Munk k over s relationship.

3. The process of claim 2 wherein said accommodation includes wicking characteristics.

4. The process of claim 2 wherein said accommodation includes density characteristics.

5. The process of claim 1 wherein, in step (c), said assignment of specific concentrations of said process colors results in an assigned total concentration of process colors within a constituent pixel that exceeds 100 percent.

6. The process of claim 1 wherein said desired distribution is one that maximizes the uniformity of said distribution of colorants within said superpixel.

7. The process of claim 1 wherein, in Step (c), said desired distribution is determined using a Sum of Squared Deviations calculation.

8. The process of claim 1 wherein, in Step (c), said assignment of specific concentrations of said process colors is made by successive rotations of a Bayer Threshold Order Array for each colorant in order to minimize a Sum of Squared Deviations calculation.

9. The process of claim 1 wherein said superpixel is used to tile a uniformly colored pattern area.

10. The process of claim 1 wherein said superpixel is used as a dithering element to color a pattern area.

11. The process of claim 1 wherein, in Step (c), said combination of process colors includes a specified concentration of a specific process color that is less than said minimum specified concentration, and which is greater than said minimum specified concentration divided by N, and wherein said specific process color is non-uniformly assigned among said N constituent pixels.

12. The process of claim 1 which further includes the following step:
   d. displaying said pattern containing said superpixel on a computer monitor.

13. The process of claim 12 which includes displaying individual pixels comprising said superpixel, prior to inter-pixel commingling, on a computer monitor.

14. The process of claim 12 which further includes the step of automatically generating instructions for actuating colorant applicators to reproduce said pattern displayed on said monitor on said absorbent substrate.

15. A process for coloring a superpixel, containing a specified number of constituent pixels N and using a pre-defined set of process colors, for use in coloring a pattern area on an absorbent substrate having a specified target color, said process further providing for the display of said target color expressed by said superpixel, comprising the steps of:
   a. defining the color component values of said process colors, wherein said color component values include an accommodation for the reflectivity of said absorbent substrate;
   b. defining a combination of said process colors of specified concentrations to be assigned to said superpixel that, when blended together, will produce said target color, wherein said assignment of process colors to specific constituent pixels is constrained by a minimum specified concentration;
   c. determining the color component values of said target color, and
   d. determining, within said combination of said process colors of Step (b), an assignment of specific concentrations of said process colors to specific constituent pixels that produces a desired distribution of colorants within said superpixel.

16. The process of claim 15 wherein said accommodation involves the use of the Kubelka-Munk k over s relationship.

17. The process of claim 16 wherein said accommodation includes wicking characteristics.

18. The process of claim 16 wherein said accommodation includes density characteristics.

19. The process of claim 15 wherein, in Step (d), said assignment of specific concentrations of said process colors results in an assigned total concentration of process colors within a constituent pixel that exceeds 100 percent.

20. The process of claim 15 wherein said distribution is one that maximizes the uniformity of said distribution of colorants within said superpixel.

21. The process of claim 15 wherein said desired distribution is determined using a Sum of Squared Deviations calculation.

22. The process of claim 15 wherein in Step (d), said assignment of specific concentrations of said process colors is made by successive rotations of a Bayer Threshold Order Array for each colorant in order to minimize a Sum of Squared Deviations calculation.

23. The process of claim 15 wherein said superpixel is used to tile a uniformly colored pattern area.

24. The process of claim 15 wherein said superplxel is used as a dithering element to color a pattern area.

25. The process of claim 15 wherein, in Step (b), said combination of process colors includes a specified concentration of a specific process color that is less than said minimum specified concentration, and which is greater than said minimum specified concentration divided by N, and wherein said specific process color is non-uniformly assigned among said N constituent pixels.

26. The process of claim 15 which further includes the following step:
 e. displaying said target color containing said colored superpixel on a computer monitor.

27. The process of claim 26 which further includes displaying individual pixels comprising said superpixel, prior to inter-pixel colorant commingling, on a computer monitor.

28. The process of claim 26 which further includes the following step:
 f. automatically generating instructions for actuating colorant applicators to reproduce said pattern displayed on said monitor on said absorbent substrate.

29. The process of claim 28 wherein said instructions are sent to an array of liquid colorant applicators, each applicator being adapted to apply a liquid colorant that corresponds to a process color onto an absorbent substrate in accordance with said generated instructions.

30. For a desired pattern containing a target color, a process for reproducing said target color in pixel-wise fashion on an absorbent substrate using a pre-defined set of process colorants, each of said process colorants expressing a specified process color, said target color being expressed through the formation of at least one superpixel, said superpixel being comprised of a group of contiguous individual pixels to each of which an individual color may be assigned, said assignable individual color corresponding to the inherent color of said substrate as modified by the optional direct application of process colorant, as required by said pattern, to said substrate in pixel-wise fashion, said direct application being constrained to quantities of process colorant that exceed a threshold minimum colorant application quantity, said process comprising the steps of:
 a. specifying the color component values of each process color represented by said set of process colorants, in combination with the color component values associated with said absorbent substrate;
 b. specifying the target color in terms of a blend of process colorants, said blend being specified by concentration values of component process colorants;
 c. specifying the number N of individual pixels comprising said superpixel;
 d. determining appropriate proportions of said component process colorants to be applied to said individual pixel comprising said superpixel to form a process colorant blend that expresses said target color, wherein all such proportions involve process colorant concentrations that are greater than said threshold minimum colorant application quantity; and
 e. constructing said superpixel by assigning specific concentrations of said component process colorants to specific individual pixels comprising said superpixel.

31. The process of claim 30 wherein said superpixel is used to tile a uniformly colored pattern area.

32. The process of claim 30 wherein said group of pixels express a target color as a dithering element in a dithered image.

33. The process of claim 30 wherein said generated color component values accommodate selected physical characteristics of said absorbent substrate, and wherein said characteristics include those that determine substrate reflectivity.

34. The process of claim 33 wherein said accommodation involves the use of the Kubelka-Munk K over s relationship.

35. The process of claim 33 wherein said selected physical characteristics of said absorbent substrate include wicking characteristics.

36. The process of claim 33 wherein said selected physical characteristics of said absorbent substrate include density characteristics.

37. The process of claim 30 wherein the collective colorant concentration values of said pixels within said superplxel is about 100%.

38. The process of claim 30 wherein the collective colorant concentration values of said pixels within said superpixel is greater than 100%.

39. The process of claim 30 wherein said superpixel is constructed using a 2×2 Bayer Threshold Order Array.

40. The process of claim 30 wherein said colorants are distributed within said superpixel to maximize the uniformity of the distribution of colorants within said superplxel.

41. The process of claim 40 wherein the uniformity of said colorant distribution is determined using a Sum of Squared Deviations calculation.

42. The process of claim 30 wherein, in Step (e), said assignment of specific concentrations of said process colors is made by successive rotations of a Bayer Threshold Order Array for each colorant in order to minimize a Sum of Squared Deviations calculation.

43. The process of claim 30 wherein said pattern is constructed using at least one target color expressed through the formation of at least one superpixel and is displayed as a digitally defined image on a computer monitor.

44. The process of claim 43 which includes displaying individual pixels comprising said superpixel, prior to inter-pixel colorant commingling, on a computer monitor.

45. The process of claim 30 wherein said assignment of specific concentrations of component process colorants to specific individual pixels is converted to instructions for actuating an array of dye applicators that collectively direct said process colorants onto said substrate surface in accordance with said pattern.

* * * * *